(12) United States Patent
Christensen et al.

(10) Patent No.: US 11,270,394 B2
(45) Date of Patent: **\*Mar. 8, 2022**

(54) SYSTEMS AND METHODS FOR PERSONALIZED TRANSACTIONS AND INDIVIDUALIZED PAYMENT BY ASSOCIATING DEVICE WITH JOINT TRANSACTION

(71) Applicant: Worldpay, LLC, Symmes Township, OH (US)

(72) Inventors: Coy A. Christensen, Scottsdale, AZ (US); Scot Bryant, Phoenix, AZ (US); Michael de la Fuente, Tempe, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,447

(22) Filed: Jan. 15, 2021

(65) Prior Publication Data

US 2021/0133900 A1    May 6, 2021

Related U.S. Application Data

(63) Continuation of application No. 16/227,682, filed on Dec. 20, 2018, now Pat. No. 10,922,764, which is a
(Continued)

(51) Int. Cl.
*G06Q 50/12* (2012.01)
*G06Q 20/32* (2012.01)
(Continued)

(52) U.S. Cl.
CPC ............. *G06Q 50/12* (2013.01); *G06Q 20/14* (2013.01); *G06Q 20/322* (2013.01); *G06Q 20/405* (2013.01)

(58) Field of Classification Search
CPC .... G06Q 50/12; G06Q 20/405; G06Q 20/322; G06Q 20/14
See application file for complete search history.

(56) References Cited

U.S. PATENT DOCUMENTS 6,366,196 B1 * 4/2002 Green ................... G06Q 50/12
340/10.6
7,457,767 B1 * 11/2008 Dunsmore ........... G06Q 20/204
705/17

(Continued)

OTHER PUBLICATIONS

Bhargave et al. "Digital Ordering System for Restaurant Using Android". International Journal of Scientific and Research Publications, vol. 3, Issue 4, Apr. 2013. (Year: 2013).*

(Continued)

*Primary Examiner* — Nathan A Mitchell
(74) *Attorney, Agent, or Firm* — Bookoff McAndrews, PLLC

(57) ABSTRACT

Systems and methods are disclosed for managing personalized dining checks created by individualized check item ownership or payment enabled by associating device and table indicia. One method includes: receiving information identifying the mobile devices of one or more patrons and information identifying a table indicia as a result of associating the mobile devices of the one or more patrons with a table indicia; receiving requests for dining items, transaction amounts for each dining item, and payment preferences associated with each dining item from each of the one or more patrons; determining the amounts owed by each patron, based on the dining items requested by each patron, transaction amounts for each dining item, and the payment preference of each patron for each requested dining item; and outputting the amount owed by each patron to an electronic storage medium or display of the mobile device of each patron.

20 Claims, 10 Drawing Sheets

Related U.S. Application Data continuation of application No. 15/389,034, filed on Dec. 22, 2016, now Pat. No. 10,255,645.

(51) Int. Cl.
*G06Q 20/14* (2012.01)
*G06Q 20/40* (2012.01)

(56) References Cited

U.S. PATENT DOCUMENTS

| | | | | |
|---|---|---|---|---|
| 9,514,427 B2* | 12/2016 | Taylor | | G06Q 10/0631 |
| 9,665,858 B1* | 5/2017 | Kumar | | G06Q 20/3224 |
| 9,875,469 B1* | 1/2018 | Chin | | G06Q 20/3276 |
| 9,928,489 B2* | 3/2018 | Ohnishi | | G06Q 20/102 |
| 9,990,621 B1* | 6/2018 | Ng | | G06Q 20/202 |
| 2004/0248548 A1* | 12/2004 | Niwa | | G06Q 20/322 |
| | | | | 455/407 |
| 2005/0108116 A1* | 5/2005 | Dobson | | G06Q 40/12 |
| | | | | 705/30 |
| 2006/0143087 A1* | 6/2006 | Tripp | | G06Q 50/12 |
| | | | | 705/15 |
| 2006/0186197 A1* | 8/2006 | Rosenberg | | G06Q 50/12 |
| | | | | 235/380 |
| 2006/0229984 A1* | 10/2006 | Miyuki | | G06Q 20/382 |
| | | | | 705/40 |
| 2009/0037286 A1* | 2/2009 | Foster | | G06Q 20/202 |
| | | | | 705/21 |
| 2009/0288012 A1* | 11/2009 | Hertel | | G06Q 20/326 |
| | | | | 715/738 |
| 2012/0036028 A1* | 2/2012 | Webb | | G06Q 30/06 |
| | | | | 705/15 |
| 2012/0166332 A1* | 6/2012 | Naaman | | G06Q 20/3278 |
| | | | | 705/40 |
| 2012/0173396 A1* | 7/2012 | Melby | | G06Q 30/04 |
| | | | | 705/34 |
| 2013/0232017 A1* | 9/2013 | Nathanel | | G06Q 20/29 |
| | | | | 705/16 |
| 2014/0006205 A1* | 1/2014 | Berry | | G06Q 20/322 |
| | | | | 705/26.7 |
| 2014/0074691 A1* | 3/2014 | Bank | | G06Q 20/3278 |
| | | | | 705/39 |
| 2014/0100931 A1* | 4/2014 | Sanchez | | G06Q 20/102 |
| | | | | 705/14.23 |
| 2014/0164234 A1* | 6/2014 | Coffman | | G06Q 20/14 |
| | | | | 705/40 |
| 2014/0180929 A1* | 6/2014 | Ohnishi | | G06Q 20/102 |
| | | | | 705/64 |
| 2014/0222663 A1* | 8/2014 | Park | | G06Q 20/027 |
| | | | | 705/39 |
| 2014/0244409 A1* | 8/2014 | Nathanel | | G06Q 30/02 |
| | | | | 705/15 |
| 2014/0279098 A1* | 9/2014 | Ham | | G06Q 20/102 |
| | | | | 705/16 |
| 2014/0324606 A1* | 10/2014 | Fortuna | | G06Q 20/322 |
| | | | | 705/15 |
| 2014/0330654 A1* | 11/2014 | Turney | | G06Q 20/3224 |
| | | | | 705/15 |
| 2014/0351118 A1* | 11/2014 | Zhao | | G06Q 20/102 |
| | | | | 705/40 |
| 2015/0025983 A1* | 1/2015 | Cicerchi | | G06Q 20/047 |
| | | | | 705/15 |
| 2015/0120345 A1* | 4/2015 | Rose | | G06Q 10/02 |
| | | | | 705/5 |
| 2015/0310408 A1* | 10/2015 | Anderson | | G06Q 20/32 |
| | | | | 705/39 |
| 2015/0339318 A1* | 11/2015 | O'Toole | | G06Q 20/102 |
| | | | | 705/40 |
| 2015/0348144 A1* | 12/2015 | Zamer | | G06Q 20/32 |
| | | | | 705/40 |
| 2015/0373762 A1* | 12/2015 | Raj | | H04W 76/14 |
| | | | | 370/329 |
| 2016/0189461 A1* | 6/2016 | Kanon | | H04L 63/061 |
| | | | | 705/51 |
| 2016/0244311 A1* | 8/2016 | Burks | | G06Q 20/18 |
| 2016/0267448 A1* | 9/2016 | James | | G06Q 20/102 |
| 2017/0061523 A1* | 3/2017 | Zambo | | G06Q 30/0633 |
| 2017/0109843 A1* | 4/2017 | Berg | | G06Q 20/326 |
| 2017/0193488 A1* | 7/2017 | Renke | | G06Q 20/322 |
| 2017/0279903 A1* | 9/2017 | Mimassi | | H04L 67/18 |
| 2018/0218346 A1* | 8/2018 | Renke | | G06Q 20/045 |

OTHER PUBLICATIONS

DeArtola et al. "OmniSplit: a mobile food ordering platform for restaurant staff and patrons". Computer Engineering Senior Theses. 47. Retrieved from <https://scholarcommons.scu.edu/cseng_senior/47>. 2015. (Year: 2015).*

Khairunnisa et al. "The Application of Wireless Food Ordering System". MASAUM Journal of Computing, vol. 1 Issue 2, pp. 178-184. Sep. 2009. (Year: 2009).*

De Artola et al. "OmniSplit: a mobile food ordering platform for restaurant staff and patrons". Computer Engineering Senior Theses. 47. Retrieved from . 2015.

Diaz et al. Split-n-pay proposal. Retrieved from <https://courses .cs .northwestern .edu/394/proposals/M EM %20Spl itn PayProposal %20-%20 Final. pdf>. 2012.

* cited by examiner

FIG. 3E

MENU | TABS (3) | PAYMENT

BEST RESTAURANT

WAITER: BOB  BEACON: 9
DINING SESSION: 3468  PATRONS: 3

1 HAMBURGER ............ $9.99
1/2 FRIES .................. $5.24
1/3 FRUIT SALAD ......... $4.24
            SUBTOTAL>> $19.47
                 TAX>> $1.61
               TOTAL>> $21.08

ADD TIP
○ ZERO  ● 15%  ○ 20%
○ 25%   ○ 30%  ○ CUSTOM ☐

YOUR PAYMENT AMOUNT  $24.24

YOUR PAYMENT METHOD
● PAYPAL...ABC@DEF.COM
○ VISA..5331

ADD PAYMENT SOURCE | PAY

302E — (MENU | TABS (3))
304E — (WAITER/BEACON/items/totals)
306E — (ADD TIP section)
308E — $24.24

SYSTEMS AND METHODS FOR PERSONALIZED TRANSACTIONS AND INDIVIDUALIZED PAYMENT BY ASSOCIATING DEVICE WITH JOINT TRANSACTION

CROSS-REFERENCE TO RELATED APPLICATION(S)

This patent application is a continuation of and claims the benefit of priority to U.S. application Ser. No. 16/227,682, filed on Dec. 20, 2018, which is a continuation of and claims the benefit of priority to U.S. application Ser. No. 15/389,034, filed Dec. 22, 2016, now U.S. Pat. No. 10,255,645, issued Apr. 9, 2019, the entireties of which are incorporated herein by reference.

FIELD OF DISCLOSURE

The present disclosure relates generally to the field of payment transactions and, more particularly, to managing payment transactions related to orders at dining venues.

BACKGROUND

Patrons at a food and/or beverage dining establishment may often be burdened with several responsibilities that may interfere with the social and/or epicurean aspect of their dining experience. For example, patrons may often have to wait to be seated by a waiter, to be hand then menus, to order food and/or beverage items, to receive final checks, and/or to submit final payments. Patrons may often be burdened with the task of calculating final payments and added tip, gratuity, and/or service fee costs. Towards the end of a dining experience, the calculation of payments owed by individual patrons among a group of patrons may present a particularly burdensome task that may interfere with the social experience of dining. There is a desire for a system and method that may automatically calculate the payments owed by each patron and decrease the social awkwardness involved with determining each patron owes.

Similarly, waiters at a food and/or beverage dining establishment may be burdened with myriad tasks that consume their time, attention, and efficiency, and/or which negatively impact the bottom line revenue and cost for the dining establishment. These tasks may include, but are not limited to, seating patrons, delivering menus, taking orders, communicating orders to the kitchen staff, picking up completed food and/or beverage items from the kitchen staff, having an organized system to coordinate the various ordered food and/or beverage items to the patrons that ordered them, delivering completed food and/or beverage items to the patrons, keeping track of the bills accrued for each patron and/or group of patrons, submitting the final check to the patrons, receiving payment from the patrons, and/or otherwise attending to the needs of patrons and/or kitchen staff.

Likewise, the kitchen staff at a food and/or beverage dining establishment are also faced with the burdensome tasks of receiving the orders to prepare, cook, and/or create the ordered food and/or beverage items, including orders regarding prioritization of the food and/or beverage orders, and communicating to the waiter regarding completed food and/or beverage items or issues related to the preparation of the food and/or beverage items.

Thus, there is a desire for a system and method for facilitating communication between the patrons, waiters, and kitchen staff, and alleviating the above burdensome tasks from the patrons, waiter, and kitchen staff. There is also a desire for a personalized dining management system that may automatically keep account of the food and/or beverage items ordered by patrons and the bills accrued as a result of the orders, and that may deliver final checks to the patrons and enable the payment thereof. Furthermore, there is a desire for a personalized dining system that may automatically keep track of the accumulation of costs incurred by each individual patron of a group of patrons and which may enable each patron to pay his or her share for the dining experience.

SUMMARY

According to certain aspects of the present disclosure, systems and methods are disclosed for managing personalized dining checks created by individualized check item ownership or payment enabled by associating device and table indicia In one embodiment, a computer-implemented method is disclosed for managing personalized dining checks created by individualized check item ownership or payment enabled by associating device and table indicia. The method comprising: receiving information identifying the mobile devices of one or more patrons and information identifying a table indicia as a result of associating the mobile devices of the one or more patrons with a table indicia; receiving requests for dining items, transaction amounts for each dining item, and payment preferences associated with each dining item from each of the one or more patrons, the requests identifying the mobile devices of the one or more patrons and the table indicia; determining the amounts owed by each patron, based on the dining items requested by each patron, transaction amounts for each dining item, and the payment preference of each patron for each requested dining item; and outputting the amount owed by each patron to an electronic storage medium or display of the mobile device of each patron.

In accordance with another embodiment, a system is disclosed for managing personalized dining checks created by individualized check item ownership or payment enabled by associating device and table indicia. The system comprises: a data storage device storing instructions for managing personalized dining checks created by individualized check item ownership or payment enabled by associating device and table indicia; and a processor configured for: receiving information identifying the mobile devices of one or more patrons and information identifying a table indicia as a result of associating the mobile devices of the one or more patrons with a table indicia; receiving requests for dining items, transaction amounts for each dining item, and payment preferences associated with each dining item from each of the one or more patrons, the requests identifying the mobile devices of the one or more patrons and the table indicia; determining the amounts owed by each patron, based on the dining items requested by each patron, transaction amounts for each dining item, and the payment preference of each patron for each requested dining item; and outputting the amount owed by each patron to an electronic storage medium or display of the mobile device of each patron.

In accordance with another embodiment, a non-transitory machine-readable medium stores instructions that, when executed by a personalized dining computing system, causes the personalized dining computing system to perform a method for using managing personalized dining checks created by individualized check item ownership or payment enabled by associating device and table indicia. The method includes: receiving information identifying the mobile devices of one or more patrons and information identifying a table indicia as a result of associating the mobile devices of the one or more patrons with a table indicia; receiving requests for dining items, transaction amounts for each dining item, and payment preferences associated with each dining item from each of the one or more patrons, the requests identifying the mobile devices of the one or more patrons and the table indicia; determining the amounts owed by each patron, based on the dining items requested by each patron, transaction amounts for each dining item, and the payment preference of each patron for each requested dining item; and outputting the amount owed by each patron to an electronic storage medium or display of the mobile device of each patron.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

FIGS. 3A-3E depict various screenshots of a patron user interface of the personalized dining system.

DETAILED DESCRIPTION

Figure 1A:
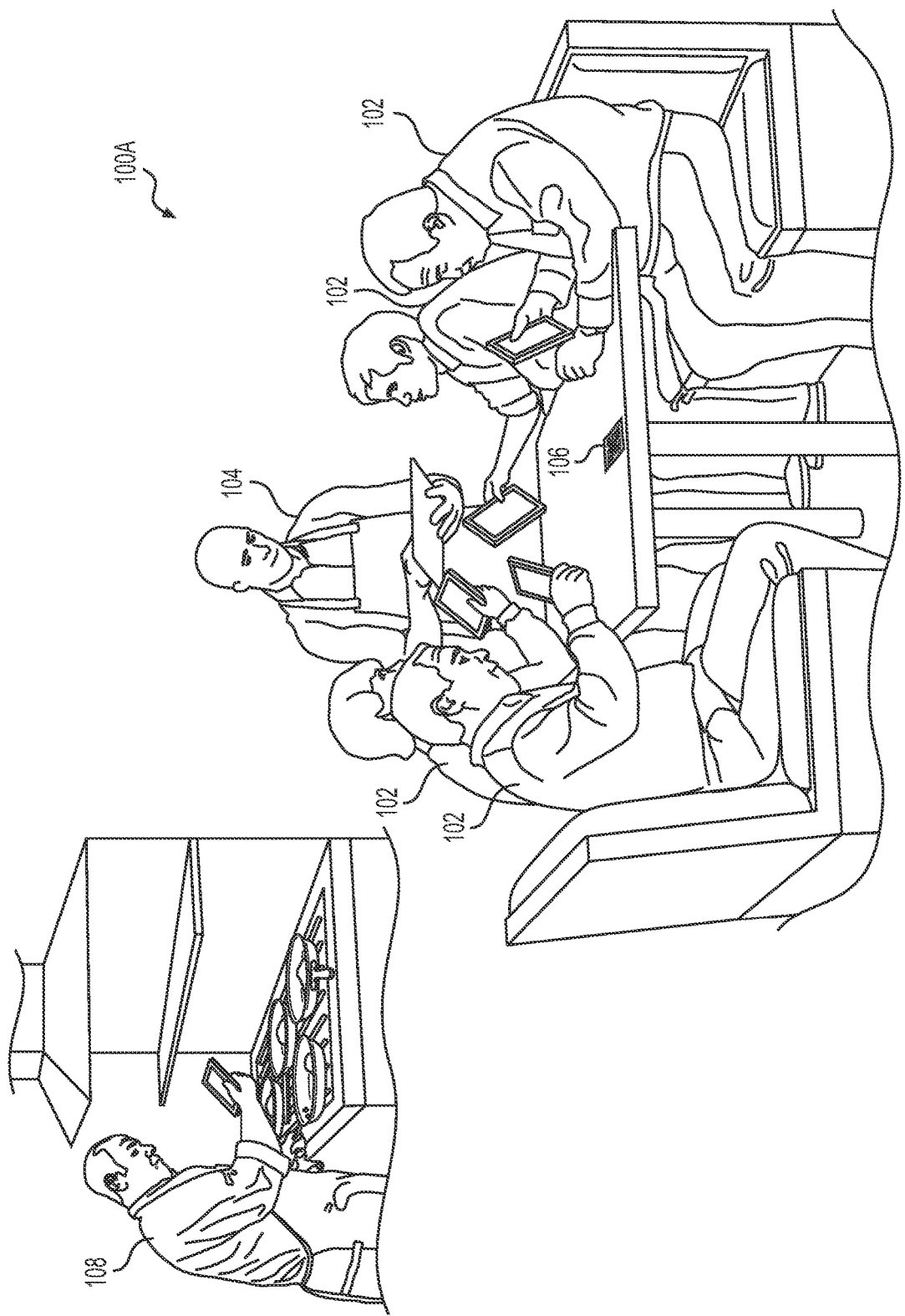
FIG. 1A depicts an illustration of the environment of the personalized dining system.

Various non-limiting embodiments of the present disclosure will now be described to provide an overall understanding of the principles of the structure, function, and use of systems and methods disclosed herein for managing personalized dining checks created by individualized check item ownership or payment enabled by associating device and table indicia ("personalized dining system").

As described above, patrons of a food and/or beverage dining establishment may find it burdensome to depend on waiters for various needs (e.g., being seated, receiving menus, ordering food and/or beverage items, receiving final checks, submitting final payments) or to perform tasks that may otherwise interfere with the dining experience (e.g., calculating final checks, tips, submitting payments, etc.). In addition, patrons may be particularly put off by the social awkwardness and burdensome task of figuring out how much each patron owes after receiving the final check. Waiters of the dining establishment may find it burdensome to seat patrons, deliver menus, take orders, communicate orders to the kitchen staff, pick up completed food and/or beverage items from the kitchen staff, remember the various ordered food and/or beverage items and the patrons that ordered them, deliver completed food and/or beverage items to the patrons, keep track of the bills accrued for each patron and/or group of patrons, submit the final check to the patrons, receive payment from the patrons, and/or otherwise attend to the needs of patrons and/or kitchen staff. Likewise, kitchen staff may find it burdensome to manage multiple tasks of receiving the orders to prepare, cook, and/or create food and/or beverage items for the patrons, including orders regarding the prioritization of a food and/or beverage order, and communicating to the waiter regarding completed food and/or beverage items or issues related to the preparation of the food and/or beverage items.

Thus, the embodiments of the present disclosure are directed to improving the experience and/or workflow of patrons, waiters, and kitchen staff in conducting their respective functions by enabling patrons, waiters, and kitchen staff to communicate with one another via a personalized dining computing system, by associating a mobile device with a table indicia, and for facilitating, through the mobile device of each patron, an automatic calculation of the amount owed by the patron for his or her share of the ordered food and/or beverage items. The embodiments of the present disclosure may enable the patrons to check-in at a table and/or receive final checks, among other functions, by associating the mobile devices of the patrons with a table indicia affixed to a table of a dining establishment. Furthermore, the embodiments of the present disclosure may provide the patrons with a user interface that may enable patrons to select food and/or beverage items using an interactive menu, split food and/or beverage items with one or more other patrons, receive individualized final checks for the amounts owed by each patron for the food and/or beverage items ordered, calculate tip, gratuity, tax, and/or service fees, and submit final payments also via the interactive mobile application. The embodiments of the present disclosure may enable the waiter to communicate with the kitchen staff and may provide the waiter with a user interface that may enable the waiter to be informed of the needs of patrons, the respective food and/or beverage orders of each patrons, and the status of the food and/or beverage orders at the kitchen. Some embodiments of the present disclosure may enable waiters to communicate the orders of patrons to the kitchen staff by associating the mobile device of the waiter with the table indicia. The embodiments of the present disclosure may provide kitchen staff with a user interface enabling the kitchen staff to view the food and/or beverage items ordered by patrons, and inform waiters and/or patrons of status updates related to the preparation, cooking, mixing, and/or completion of the food and/or beverage orders.

One or more examples of these non-limiting embodiments are illustrated in the selected examples disclosed and described in detail with reference made to FIGS. 1A-1B, 2A-2B, 3A-3E, 4-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1A depicts an illustration of an exemplary environment 100A of the personalized dining system. At a high level, various embodiments of the present disclosure may allow patron(s) ("patron(s)", "diner(s)", "patron user(s)", or "user(s)") 102, equipped with a mobile device ("patron mobile device", or "patron device"), to use their patron mobile device(s) to initiate a dining experience by tapping, scanning, and/or otherwise associating an electronic beacon ("beacon") 106 affixed to a table. Subsequently, the patron may order food and/or beverages, using an interactive menu of patron mobile device 102, and have the kitchen and/or kitchen personnel 108 be informed of the patron's orders, with or without the involvement of a waiter 104. After the ordered food and/or beverages ("order(s)") of the patron(s) 102 are ready, a waiter may deliver the order(s) to the patron(s), and allow an automatic transmission of the final check ("check(s)" or "bills") for the orders and service, by tapping, scanning, and/or otherwise associating the beacon 106 with the waiter's mobile device ("waiter mobile device" or "waiter device").

Figure 1B:
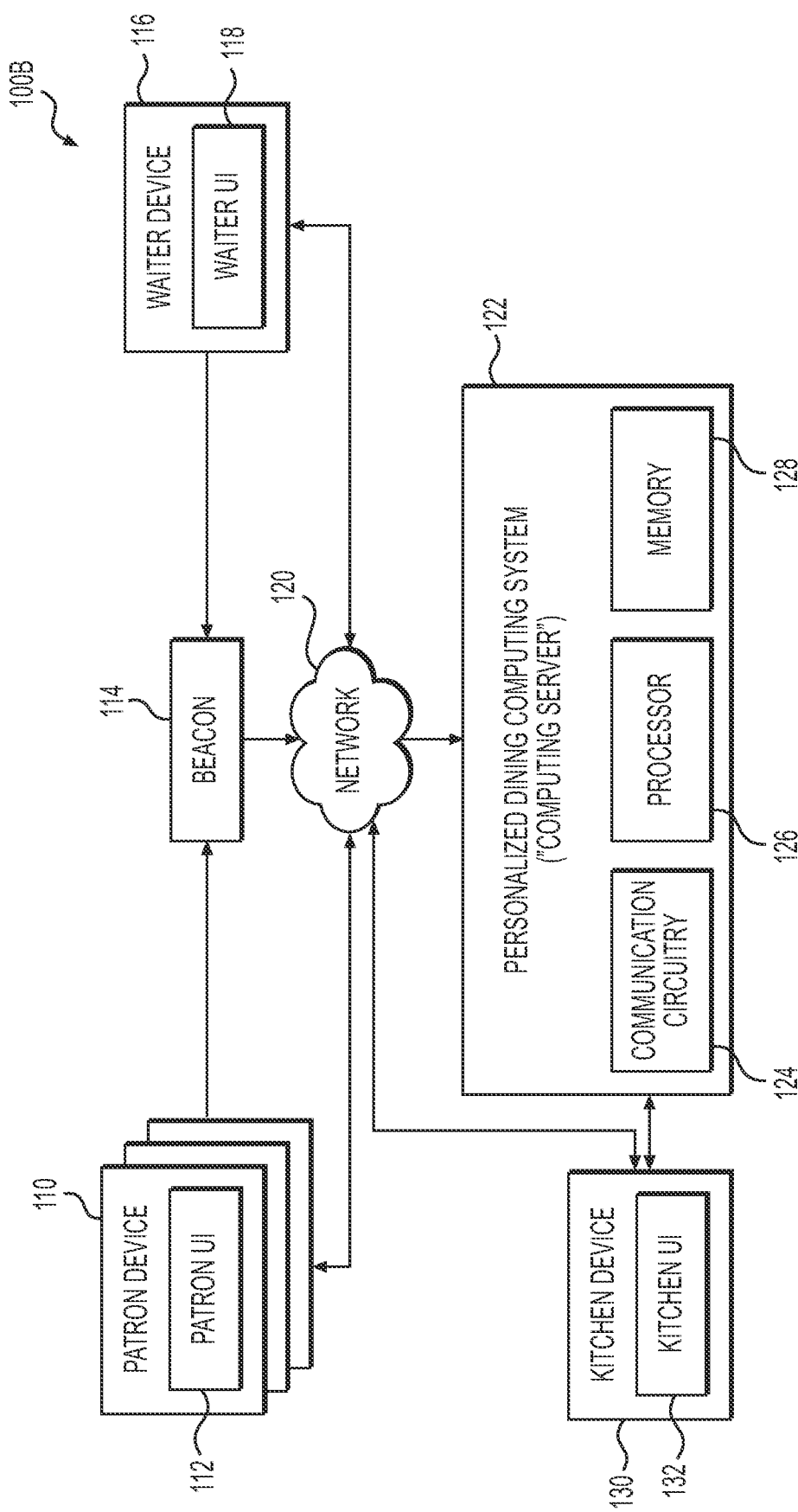
FIG. 1B depicts a block diagram of an example network of the personalized dining system.

FIG. 1B depicts a block diagram of an exemplary environment 100B of the personalized dining system. Specifically, environment 100B includes a plurality of patron mobile devices 110, each having a user interface ("patron user interface" or "patron UI") 112 enabling patron 102 to initiate a dining experience (also referred to as "initiate dining session"), access an interactive menu, order food and/or beverages, scan and/or tap beacon 114, and/or pay the bill for the ordered food and/or beverage and service. In some embodiments, patron 102 may be able to summon waiter 104 using patron user interface 112 or beacon 114.

Environment 100B further includes beacon 114. Beacon 114 may be one or more of a one-dimensional bar code, a two-dimensional bar code (e.g., a QR code), a radiofrequency identification (RFID) device, a passive integrated circuit, a near field communication (NFC) device, or any device having a mechanism to relay information identifying a given table to a mobile device or a patron mobile device 110 and/or waiter mobile device 116 to personalized dining computing system 112. In some embodiments, beacon 114 may also have the ability to summon waiter 116 (e.g., via a button).

Environment 100B further includes one or more waiter mobile devices 116, having a user interface ("waiter user interface" or "waiter UI") 118 enabling waiter 104 to scan and/or tap beacon 114, facilitate the transmission of bills, be informed of the status of placed food and/or beverage orders, facilitate the initiation and/or termination of dining sessions, and facilitate the communication of food and/or beverage orders with kitchen 130. However, in some embodiments, patron 102 may be able to send the food and/or beverage orders to kitchen 130 to be prepared, without needing a waiter. In some embodiments, waiter 104 may be able to prioritize certain orders over other orders, and/or provide special instructions for the preparation of ordered food and/or beverages, using waiter user interface 118 of waiter device 116. In some embodiments, waiter 104 may have the option to send the orders of patron 102 to kitchen 130 to be prepared or placed in line, but not cooked yet, along with the option to inform kitchen 130 to start cooking an order of patron 110 that was previously prepared or placed in line, but not cooked yet.

In one embodiment, in addition to or as an alternative to use of beacon 114, a localized or proximity Wi-Fi may be configured to identify a table, sense when individual patrons with patron mobile device(s) 110 and/or waiters with waiter mobile device(s) 116 are at the table, and/or relay information identifying the table or transaction related information to the patron mobile device(s) 110, waiter mobile device(s) 116, or to personalized dining computing system 112. In such embodiments, the sensing may occur as a result of the proximity of a patron mobile device 110 or waiter mobile device 116 to the localized or proximity Wi-Fi, and/or may occur as a patron or waiter connects to the Wi-Fi. Thus, in such embodiments, instead of patrons having to scan the beacon with their patron mobile device(s), the personalized dining computing system 112 (via the localized or proximity Wi-Fi) may be configured to recognize when a patron is in the dining venue and/or identify what table the patron may be sitting at. The process may occur automatically, without the need for beacon 114, or may involve the first patron at a table to initially scan beacon 114, before the localized or proximity Wi-Fi continues the process automatically.

Environment 100B further includes a kitchen or one or more kitchen personnel equipped with a kitchen device 130 (collectively referred to as "kitchen" or "kitchen device"), with each kitchen device having a user interface ("kitchen user interface" or "kitchen UI") 132 enabling one or more kitchen personnel to receive food and/or beverage orders of patron 110, receive instructions related to preparing, expediting, prioritizing, and/or delaying the food and/or beverage orders of patron 110, send notifications to the personalized dining computing system ("computing server") regarding the start of the preparation, cooking, and/or placing in line, the food and/or beverage order of patron 110, or the completion of the preparation and/or cooking of a food and/or beverage order of patron 110.

Environment 100б may further include a network 120 that serves as a medium for wireless communication between the personalized dining computing system ("computing server"), and one or more of patron 110, beacon 114, waiter 116, or kitchen 130.

Environment 100B further includes personalized dining computing system ("computing server") 122. The computing server 122 may be embodied as any type of server or computing device capable of processing, communicating, storing, maintaining, and/or transferring data. For example, computing server 122 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. Alternatively or additionally, the functions described herein as being performed by computing server 122 may be performed entirely in a cloud environment.

The computing server 122 may comprise a memory ("memory") 128 that keeps track of the beacons of a dining venue, dining sessions associated with a beacon, patrons and orders associated with each patron for a given dining session, the status of the orders (e.g., ordered, in line, preparing, cooking, completed, etc.), as well as information related to payment status of each patron 110. In some embodiments, computing server may manage the information (e.g., the beacons of a dining venue, dining sessions associated with a beacon, patrons and orders associated with each patron for a given dining session, the status of the orders, information related to payment status of each patron, etc.) using a database. In one embodiment, the information related to payment, including but not limited to, the amount owed by patron(s), status of a payment transaction by a patron, the source of funds of patron(s) to be used for the transaction amount ("payment source"), etc., may be managed using a ledger or shared ledger that utilizes block chain technology. In some embodiments, computing server 122 may include an update interface that keeps track of updates in the status of orders placed, the status of bills and checks of a patron, and/or status of a dining session associated with beacon 114. In some embodiments, the update interface may be synchronized with one or more of the waiter device, kitchen device, and/or patron device. Thus, in such embodiments, as kitchen 130 inputs status updates (e.g., order placed in-line, order being prepared, order ready, etc.) regarding an ordered food and/or beverage item, the status update may be immediately reflected in one or more of the computing server 122, waiter UI 118, and/or patron UI 112

The computing server may further comprise a communication circuitry 124 for enabling communication with various components of environment 1006, and processor 126 for managing information received from communication circuitry 124 and for processing bills and payments related to food and beverage orders of patron 110.

The communication circuitry 124 of computing server 122 may be embodied as any type of communication circuit, device, interface, or collection thereof, capable of enabling communications between computing server 122 and patron 110, beacon 114, waiter 116, and/or kitchen 130 via network 120. For example, the communication circuitry 124 may be embodied as one or more network interface controllers (NICs), using any one or more communication technologies (e.g., wireless or wired communications) and associated protocols (e.g., Ethernet, Wi-Fi®, WiMAX, etc.) to effect such communication.

Processor 126 may be embodied as any type of processor capable of performing the functions described herein. For example, the processor 126 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, computing server 122 may include a system bus for interconnecting the various components of the computing server 122.

The memory 128 may be embodied as any type of volatile or non-volatile memory or data storage capable of performing the functions described herein. For example, one or more devices comprising the memory 128 may be embodied as read-only memory (ROM), random access memory (RAM), cache memory associated with processor 214, or other memory devices such as dynamic RAM (DRAM), magnetic RAM (MRAM), static ram (SRAM), programmable ROM (PROM), electrically erasable PROM (EEPROM), flash memory, a removable memory card or disk, a solid state drive, and so forth. In operation, memory 128 may store various data and software used during operation of the computing server 122, such as operating systems, applications, programs, libraries, and drivers.

Memory 122 may also be embodied as any type of device or devices configured for short-term or long-term storage of data such as, for example, memory devices and circuits, memory cards, hard disk drives, solid-state drives, or other data storage devices, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth, or flash drives, solid state hard drives, redundant array of individual disks (RAID), virtual drives, networked drives and other memory means including storage media on the processor 126. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In one embodiment, the computing server 122 may provide the environment with an alternative or additional network 120. This alternative or additional network, being hosted by computing server 122, may allow the system to bypass or avoid fees related to the transfer of data across existing networks.

In one embodiment, the kitchen UI 132 may be an extension of computing server 122. For example, kitchen personnel may input a status update pertaining to an ordered food and/or beverage into the kitchen UI 132 and directly change the status of an ordered food and/or beverage in the database of computing server 122.

Figure 2A:
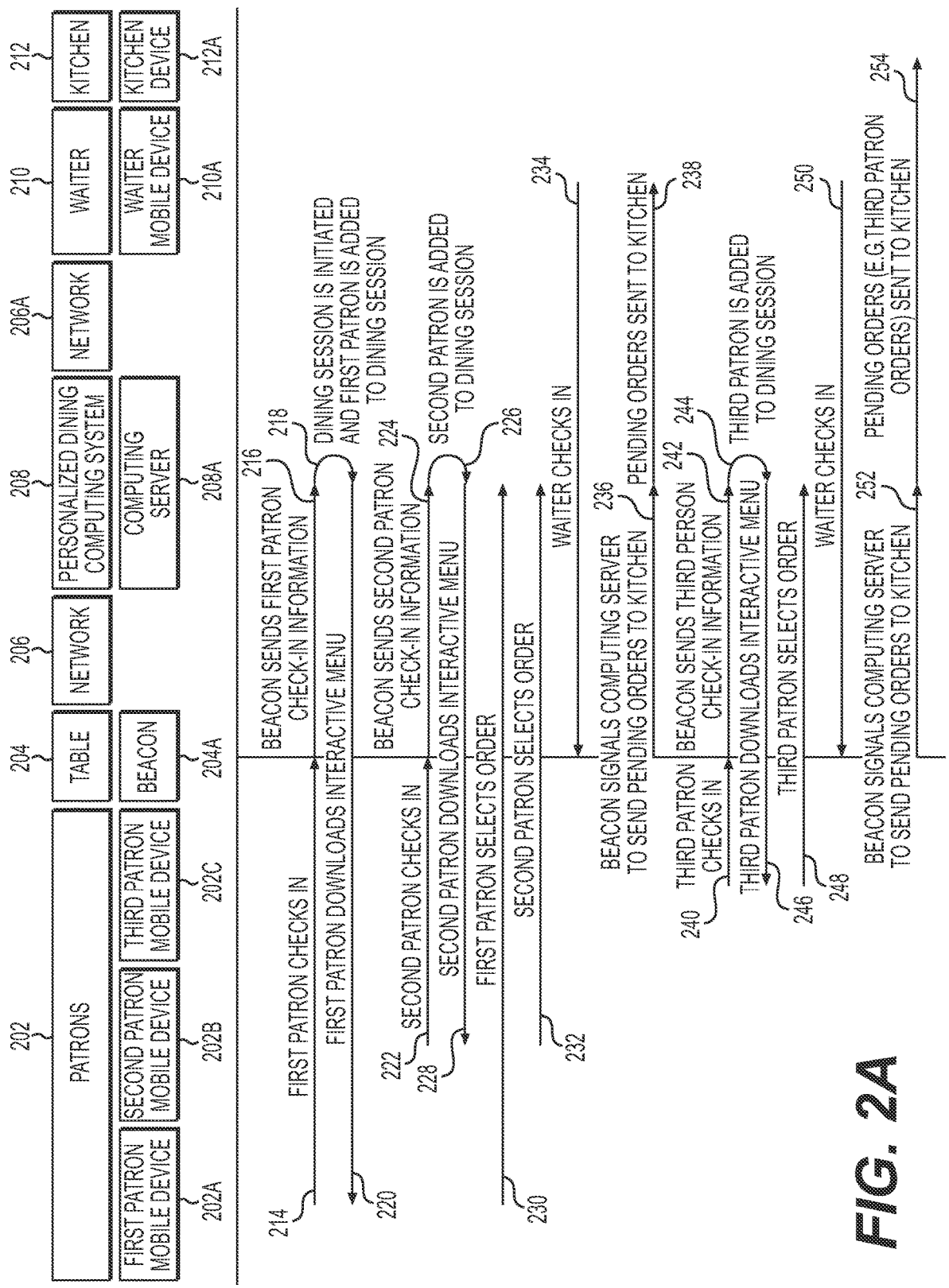
FIG. 2A depicts a simplified sequence flow diagrams of a method for ordering of food or beverage(s) in accordance with non-limiting embodiments of the personalized dining system.
Figure 2B:
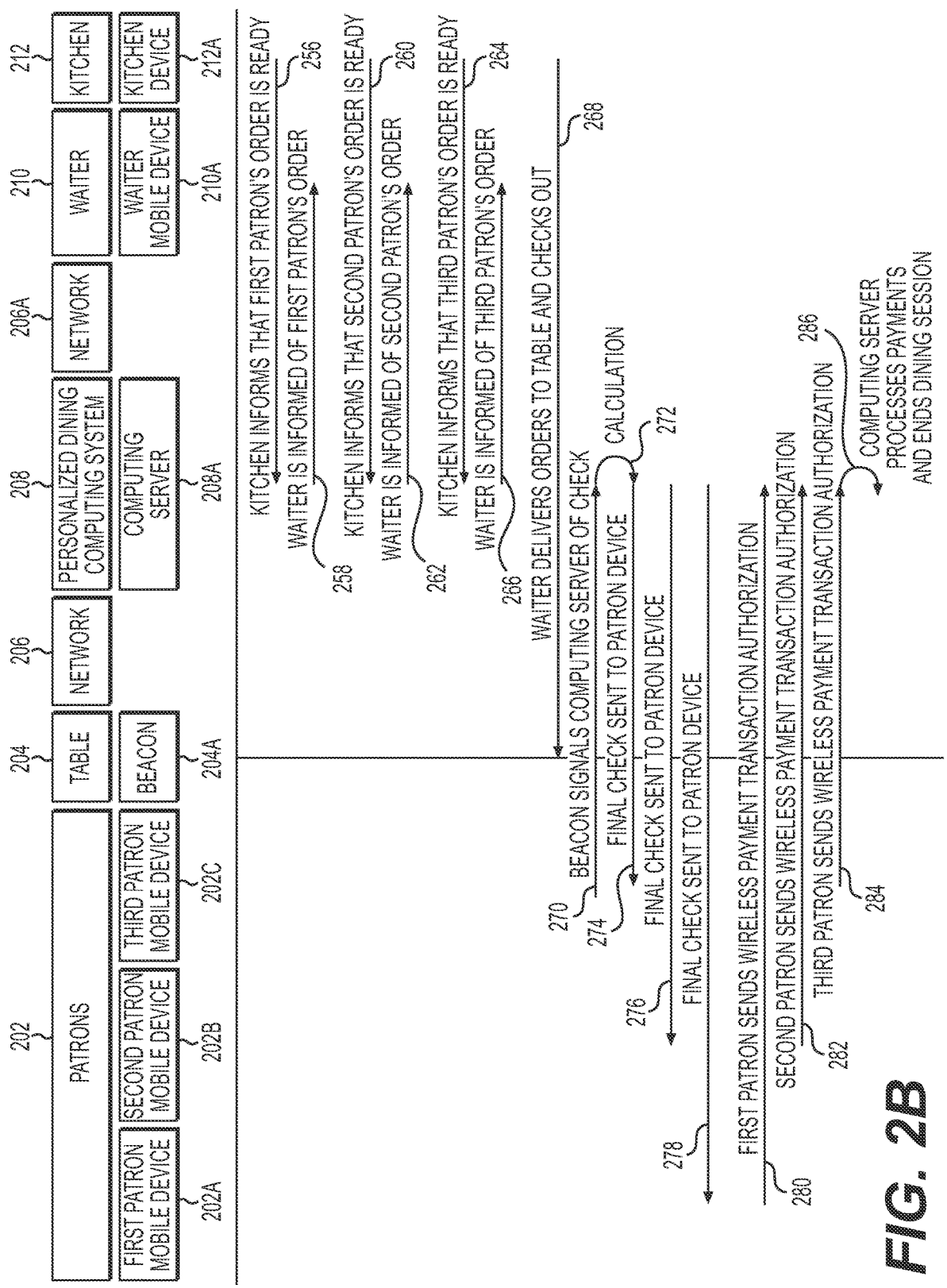
FIG. 2B depicts a simplified sequence flow diagrams of a method for serving of food and beverage orders in accordance with non-limiting embodiments of the personalized dining system.

FIGS. 2A-2B depict exemplary simplified sequence flow diagrams of methods 200A and 200B, respectively. Specifically, FIG. 2A depicts a simplified sequence flow diagram of method 200A for managing the ordering of food or beverage(s) in accordance with non-limiting embodiments of the personalized dining system, while FIG. 2B depicts a simplified sequence flow diagram of method 200B for managing the serving of food and/or beverage orders in accordance with non-limiting embodiments of the personalized dining system.

Methods 200A and 200B may be executed by the devices and/or components related to one or more patrons 202 (e.g., first patron device 202A, second patron device 202B, and third patron device 202C), the table 204 (e.g., a beacon 204A affixed to the table), the network 206, the personalized dining computing system (e.g., computing server 208A), the waiter 210 (e.g., waiter mobile device 210A), and the kitchen 212 (e.g., kitchen device 212A). While it may or may not be shown in figures, it is assumed that communications between computing server 208A and one or more of a patron mobile device, beacon 204A, waiter mobile device 210A, or kitchen device 212A may occur via a network 206. While FIGS. 2A-2B depict three patrons (e.g., patron 1, patron 2, and patron 3) for purposes of disclosure, it is contemplated that any number of patrons may be involved in the methods discussed, and a patron may join at any time of a dining session.

Furthermore, while FIG. 2A depicts a method 200A of ordering food and/or beverage(s) by a patron where a waiter is involved in the process, the embodiments of the present disclosure also include systems and methods of ordering food and/or beverage(s) where a waiter may not be involved in the process. For example, as will be discussed below in step 234 and 250, a waiter need not check-in at beacon 204A, for an order of a patron to be sent to kitchen 212, according to certain embodiments of the present disclosure.

Thus, in such embodiments, when a patron selects a food and/or beverage order ("order(s)") using patron mobile device, the order may be communicated to the computing server 208A, and then subsequently communicated to the kitchen device 212A, without the need of waiter 210. Furthermore, in some embodiments, a patron may directly send orders to kitchen device 212A, using patron mobile device, without the need of computing server 208A to relay the orders to kitchen device 212A. In such embodiments, it may even be the case that the computing server may be used as a kitchen device by displaying ordered food and/or beverages and/or receiving inputs by kitchen personnel, via a user interface. Nevertheless, steps 216-254, depicted in FIG. 2A, are an exemplary embodiment of ordering food and/or beverage(s) using the personalized dining system, where a waiter may be involved in the process.

At step 214, a patron who is the first in a group of patrons to enter a dining venue and be seated at a table ("first patron") may check in at the table 204 using a mobile device of the first patron ("first patron mobile device") 202A. In some embodiments, the act of checking in (also referred to as "signing in," "check in", "tap in," etc.) by a patron may include associating the mobile device of a patron with a beacon 204A that may be affixed to the table. The association may be performed, for example, by scanning a 1-dimensional or 2-dimensional bar code (e.g., QR code) of the beacon with the patron mobile device. Alternately or additionally, the association may be made by entering patron mobile device information into beacon 204A or entering identifying information of the beacon into the mobile device of the patron. Alternative or additionally, in lieu of use of a beacon 204A, the check-in process may occur when the patron mobile device enters the zone of a localized or proximity Wi-Fi, and the Wi-Fi is configured to identify and/or receive identifying information of the patron mobile device. The beacon 204A may be one or more of an electronic device having a 1-dimensional bar code, an electronic device having a 2-dimensional bar code (e.g., a QR code), a radiofrequency identification (RFID) device, a passive integrated circuit, a near field communication (NFC) device, or any device having a mechanism to relay information identifying a patron mobile device and/or waiter mobile device 116 to computing server 208A.

At step 216, subsequent to first patron checking in, beacon 204A may transmit one or more check-in information related to the patron to computing server 208A via a network 206. In some embodiments, the check-in information may be transmitted in the form of a signal and/or electromagnetic wave to computing server 208A. The check-in information may include one or more of, identifying information of the beacon (or the localized or proximity Wi-Fi), the date and time of the start of the check-in, and identifying information of the patron mobile device that checked in.

At step 218, computing server 208A may initiate a dining session and add first patron to the dining session. Subsequent to receiving a patron's check-in information from beacon 204A (e.g., as in step 216), computing server 208A may determine whether there is an ongoing dining session associated with the beacon 204A from which check-in information has been received. If the beacon does not have an ongoing dining session, computing server 208A may initiate a dining session for beacon 204A and add the patron associated with the check-in (e.g., first patron according to step 218) to the dining session. If, for example, computing server 208A determines that there is already an ongoing dining session associated with beacon 204A, computing server may simply add the patron associated with the check-in information to the dining session, without initiating a new dining session.

A dining session may indicate, electronically, that a beacon, and possibly a table associated with the beacon, is currently being used by one or more patrons for dining. A computing server may have a record of all beacons of a dining venue in a memory and/or database. Initiating a dining session may include the computing server identifying the beacon from which the check-in information originated from, and, if that beacon does not already have an ongoing dining session, indicating that there is a new dining session in place.

A dining session may have a unique identification ("dining session ID") that may be generated when the dining session is initiated by the computing server. The dining session ID may be related to and/or generated from one or more of the identifying information of a table and/or beacon at which the patron(s) of a dining session may be seated, the date and/or time of the creation of the dining session, the identifying information of the first patron, a randomly generated number, or a combination thereof. A dining session may signify, at a high level, that a beacon, and/or table associated with a beacon has been occupied by a group of one or more patrons. Furthermore, initiating a dining session may enable, at a high level, the management of the ordering and service of food and/or beverages, and the payment transaction associated with the ordering and service of food and/or beverages. In some embodiments, a beacon may be limited to having at most one dining session at a given time. Thus, the computing server may prevent initiating a dining session for a beacon that has an ongoing dining session, for example, when a previous dining session associated with the beacon has not terminated yet. In some embodiments, computing server 208A may initiate a dining session by entering the time at which the first patron checked-in, which may be obtained from the received check-in information, into the database, memory and/or electronic storage medium allotted to the beacon.

Furthermore, computing server 208A may enter identifying information of patron(s) as they are added to the dining session, along with patron orders. In some embodiments, computing server 208A may manage the above information related to a dining session and patron orders using a shared database, shared ledger, and/or block chain technology.

Figure 3B:
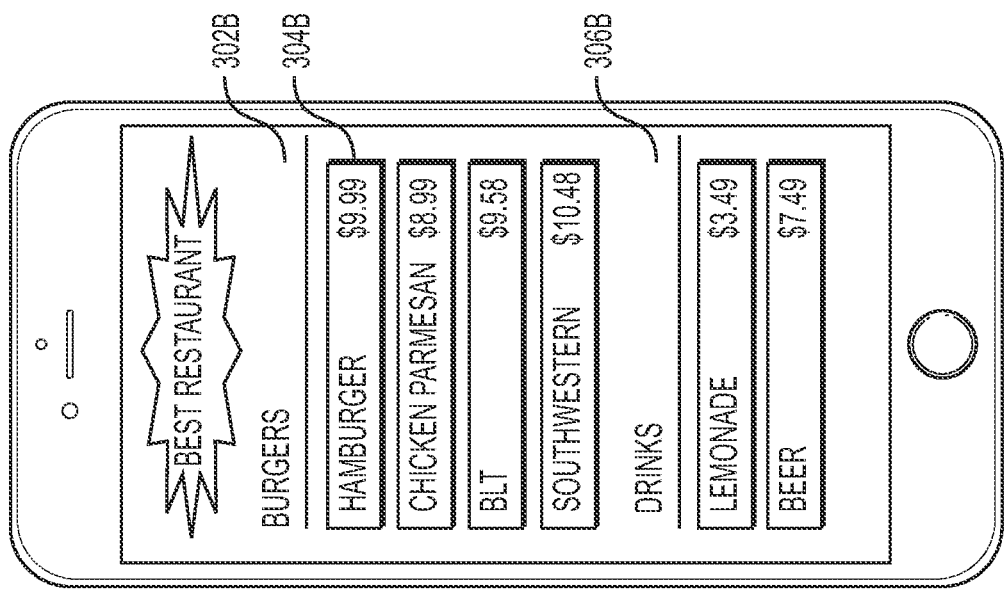
Figure 3A:
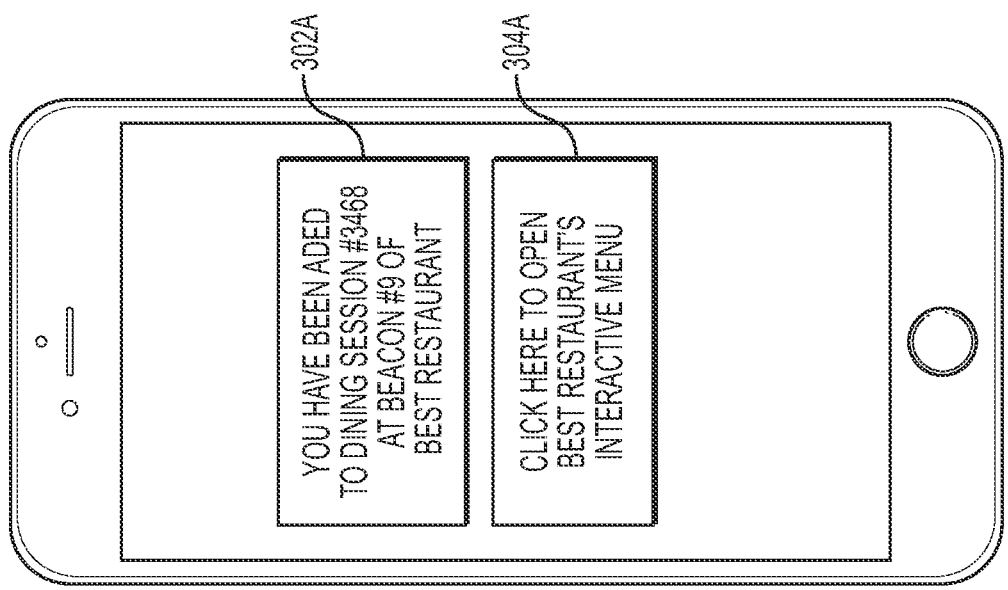

At step 220, computing server 208A may send first patron an interactive menu for first patron to download and order food and/or beverage items using first patron mobile device 202A. The transmission of an interactive menu by the computing server to the mobile device of a patron may be automatic, subsequent to adding the patron to a dining session. Computing server 208A may deliver the interactive menu to the first patron mobile device 202A via network 206. In some embodiments, the interactive menu may be accessible to a patron even prior to the patron being added to a dining session. In another embodiment, while the interactive menu may be accessible to a patron even prior to the patron being added to a dining session, the interactive menu may be password protected, and being added to a dining session may allow the patron to receive the password to access the interactive menu on patron mobile device from computing server 208A via network 206. The interactive menu may enable a patron to order food and/or beverage items listed on the interactive menu using the patron mobile device. FIGS. 3A-3C depict various screenshots of patron mobile device where a patron received an interactive menu, opens the interactive menu, and places an order. In some embodiments, the ability for a patron to input and/or receive information via the patron mobile device need not utilize a mobile application, and may be done entirely using a mobile internet browser.

At step 222, a second patron may check in. In some embodiments, subsequent to first patron downloading the interactive menu, the first patron may place an order for a food and/or beverage item using the downloaded interactive menu. However, FIG. 2A depicts that a second patron may check in at step 220 in order to show an embodiment where a first patron may want to wait for other patrons to show up (e.g., invitees to a dining event) before placing an order. Like step 214, a check-in by a patron may include associating the mobile device of the patron with the beacon 204A that may be affixed to a table. The association may be performed, for example, by scanning a 1-dimensional or 2-dimensional bar code (e.g., QR code) of the beacon with the patron mobile device. Alternately or additionally, the association may be made by entering patron mobile device information into beacon 204A or entering identifying information of the beacon into the mobile device of the patron. The beacon 204A may be one or more of an electronic device having a 1-dimensional bar code, an electronic device having a 2-dimensional bar code (e.g., a QR code), a radiofrequency identification (RFID) device, a passive integrated circuit, a near field communication (NFC) device, or any device having a mechanism to relay information identifying a patron mobile device and/or waiter mobile device 116 to computing server 208A.

At step 224, subsequent to second patron checking in, beacon 204A may transmit one or more check-in information related to the patron (e.g., "second patron check in information") to computing server 208A via a network 206. In some embodiments, the check-in information may be transmitted in the form of a signal and/or electromagnetic wave to computing server 208A. The check-in information may include one or more of, identifying information of the beacon, the date and time of the start of the check-in, and identifying information of the patron mobile device that checked in.

At step 226, computing server 208A may add second patron to the dining session of beacon 204A. Subsequent to receiving second patron's check-in information from beacon 204A (e.g., as in step 224), computing server 208A may determine whether there is an ongoing dining session associated with the beacon 204A from which the check-in information has been received. The computing server may have a record of beacons of the dining venue in a memory, database, and/or electronic storage medium. After identifying the beacon from which the signal originated, the computing server may check to see if the beacon has an ongoing dining session. If the beacon does not have an ongoing dining session, computing server 208A may initiate a dining session for beacon 204A and add the second patron associated with the check-in to the dining session. However, as is the case with step 226, if computing server 208A determines that there is already an ongoing dining session associated with beacon 204A, computing server may simply add the patron associated with the check-in information to the dining session, without initiating a new dining session. Since a dining session had already been initiated for beacon 204A during step 218, computing server 208A may simply add second patron to the ongoing dining session at step 226. Adding a patron to a dining session may signify, at a high level, that a patron has joined an existing group of patrons for dining at table 204 associated with beacon 204A.

In some embodiments, adding a patron (e.g., second patron) to an ongoing dining session includes having computing server 208A entering identifying information related to the patron to be added (e.g., second patron) into the section within the memory, database, and/or electronic storage medium of computing server 208A allotted to the dining session of beacon 204A. In some embodiments, computing server 208A may manage the above information related to the dining session, patron orders, or the payment transaction that will occur as a result of the patron orders using a shared database, shared ledger, and/or block chain technology.

In some embodiments, a new patron may need permission from another patron, in order to join a dining session. In such embodiments, prior to adding a new patron (e.g., second patron) to the ongoing dining session, the computing server may send a request to have the new patron added to the ongoing dining session to other patrons of the ongoing dining session (e.g., first patron), and receive an acceptance of the request to have the new patron added to the ongoing dining session from the another patron of the ongoing dining session (e.g., first patron).

At step 228, second patron may download an interactive menu of the restaurant delivered to second patron mobile device 202B by the computing server 208A via network 206. The transmission of an interactive menu by the computing server to the mobile device of a patron may be automatic, subsequent to adding the patron to a dining session. In some embodiments, the interactive menu may be accessible by a patron even prior to initiating a dining session. In another embodiment, while the interactive menu may be accessible to a patron even prior to initiating a dining session, the interactive menu may be password protected, and initiating a dining session may allow a patron to receive the password to access the interactive menu on patron mobile device from computing server 208A via network 206. The interactive menu may enable a patron to order food and/or beverage items listed on the interactive menu using the patron mobile device. FIGS. 3A-3C depict various screenshots of patron mobile device where a patron received an interactive menu, opens the interactive menu, and places an order.

At steps 230, first patron may select orders for food and/or beverages using the interactive menu on first patron mobile device 202A. Likewise, at steps 232, second patron may select orders for food and/or beverages using the interactive menu on second patron mobile device 202B. Upon selecting the orders, information related to the orders and patron making the orders ("order information") may be electronically and/or wirelessly sent from the mobile devices of the first and second patrons to computing server 208A via network 206. The transmitted order information may include, but is not limited to, information identifying the patron and/or patron mobile device making the order, the name and quantity of the order, the date and time of the order, identifying information of the beacon and/or dining session in which the patron is in, the value amount to be transacted for each item of the order, information identifying the payment source a patron intends to use to eventually pay for the order, information identifying the beacon associated with the order. The order information may be received by computing server 208A using communication circuitry or interface.

In some embodiments, computing server 208A, upon receiving the order information, may locate the database, memory, and/or electronic storage medium based on information identifying the beacon, dining session, and/or patron, and store the orders for each patron of the dining session associated with beacon 204A within the database, memory, and/or electronic storage medium.

In some embodiments, a computing server, upon receiving the order information, may subsequently send relevant order information (e.g., name and quantity of the ordered items, beacon associated with the dining session of the order, etc.) to kitchen device 212A. Furthermore, in some embodiments, a patron may directly send order information to kitchen device 212A using patron mobile device. However, in the embodiment as depicted in FIG. 2A, a waiter may check-in at beacon 204A before computing server 208A may forward the order information of a patron to kitchen device 212A.

For example, at step 234, waiter 210 may check in at the beacon 204A associated with the dining session of first and second patron. A check-in by a waiter may include associating waiter mobile device 210A with beacon 204A that may be affixed to a table. The association may be performed, for example, by scanning a 1-dimensional or 2-dimensional bar code (e.g., QR code) of the beacon with the waiter mobile device. Alternately or additionally, the association may be made by entering information identifying or related to waiter mobile device 210A into beacon 204A or entering information identifying beacon 204A into waiter mobile device 210A. Alternately or additionally, waiter 210 may simply check-in by using either waiter mobile device 210A or beacon 204A individually (e.g., pressing a button on either devices).

At step 236, as a result of waiter 210 checking in at beacon 204A, the beacon signals computing server 208A to send any pending orders of patron(s) stored in computing server to kitchen device 212A. Since the pending orders, at step 236 are the orders of the first and second patron(s), the received signal would cause computing server, at step 238, to send the orders of the first and second patrons to device 212A. The signal may be transmitted from beacon 204A to computing server 208A in the form of an electronic signal and/or electromagnetic wave to computing server 208A.

At step 238, pending food and/or beverage orders of patron(s) (e.g., the orders of the first patron and second patron) are communicated to the kitchen 212. In some embodiments, the orders are transmitted electronically and/or wirelessly from computing server 208A to kitchen device 212A over network 206. In some embodiments, for example, where the orders of a patron are communicated to the kitchen as a consequence of a waiter checking in, a waiter may specify whether the kitchen should start preparing, mixing, and/or cooking the ordered food and/or beverage immediately or not as immediately. Furthermore, in such embodiments, a waiter may specify whether the order should be prioritized over other orders. Information related to the ordered food and/or beverage may be received by kitchen device 212A and may be displayed on a user interface of kitchen device 212A. The information related to the ordered food and/or beverage may include the name, content, and/or quantity of the food and/or beverage item that a patron has selected, the beacon associated with the selected order, the time at which the order had been selected, the time at which the order had been communicated to the kitchen, or any special instructions in regards to the preparation of the order. It is contemplated that in various embodiments, a patron may be able to adjust, add, and/or cancel a pending order, before and/or after the orders have been communicated to the kitchen 212. The adjustment, addition, and/or cancellation of a pending order may involve, for example, the patron inputting the decision using the patron mobile device.

At step 240, a third patron may check-in. Like steps 222 and 214, a check-in by a patron may include associating the mobile device of the patron with the beacon 204A that may be affixed to the table. The association may be performed, for example, by scanning a 1-dimensional or 2-dimensional bar code (e.g., QR code) of beacon 204A with the patron mobile device. Alternately or additionally, the association may be made by entering information identifying the patron mobile device information into beacon 204A or entering information identifying beacon 204A into the mobile device of the patron.

At step 242, subsequent to third patron checking in, beacon 204A may transmit one or more check-in information related to the third patron to computing server 208A via network 206. In some embodiments, the check-in information may be transmitted in the form of a signal and/or electromagnetic wave to computing server 208A. The check-in information may include, one or more of, information identifying beacon 204A, the date and time of the start of the check-in, and information identifying the patron mobile device that checked in (e.g., third patron mobile device 202C).

At step 244, computing server 208A may add third patron to the dining session of beacon 204A. Subsequent to receiving third patron's check-in information from beacon 204A (e.g., as in step 242), computing server 208A may determine whether there is an ongoing dining session associated with the beacon 204A from which the check-in information has been received. Since a dining session has already been initiated for beacon 204A during step 218, computing server 208A may simply add third patron to the ongoing dining session at step 244. Adding a patron to a dining session may signify, at a high level, that a patron has joined an existing group of patrons for dining at table 204 associated with beacon 204A. In the instant step, third patron may still be added to the ongoing dining session for beacon 204A, even though waiter had already checked in at step 234, and the orders of the other patron(s) (e.g., first patron and second patron) have already been sent to kitchen 212A (e.g. at steps 236 and 238). However, in some embodiments, a patron may be prevented from joining an ongoing dining session if the orders of other patrons have already been sent to kitchen 212 and/or if a waiter 210 has already checked-in at the beacon associated with the ongoing dining session.

In some embodiments, adding a patron (e.g., third patron) to an ongoing dining session may include having computing server 208A use the information identifying beacon 204A to search for beacon 204A in a database, memory, and/or electronic storage medium having a record of all beacons of the dining venue, and then enter information identifying the patron to be added (e.g., third patron) to the list of patrons in the ongoing dining session of beacon 204A. In some embodiments, computing server 208A may manage the above information related to dining session, patron orders, and payment transactions of patron orders using a shared database, shared ledger, and/or block chain technology.

In some embodiments, a new patron may need permission from another patron, in order to join a dining session. In such embodiments, prior to adding a new patron (e.g., third patron) to the ongoing dining session, the computing server may send a request to have the new patron added to the ongoing dining session to other patrons of the ongoing dining session (e.g., first and second patron), and receive an acceptance of the request to have the new patron added to the ongoing dining session from the another patron of the ongoing dining session (e.g., first and/or second patron(s)).

At step 246, third patron may download an interactive menu of the restaurant delivered to third patron mobile device 202B by the computing server 208A via network 206. Like step 220 and 228, the transmission of an interactive menu by the computing server 208A to the mobile device of a patron may be automatic, subsequent to adding the patron to a dining session. The interactive menu may enable a patron to order food and/or beverage items listed on the interactive menu using the patron mobile device. FIGS. 3A-3C depict various screenshots of patron mobile device where a patron received an interactive menu, opens the interactive menu, and places an order.

At step 248, third patron may select orders for food and/or beverages using the interactive menu on third patron mobile device 202C. Like steps 230 and 232, upon selecting the orders, information related to the order and patron making the orders ("order information") may be electronically and/or wirelessly sent from third patron mobile device 202C to computing server 208A via network 206. The transmitted order information may include, but is not limited to, information identifying the patron and/or patron mobile device making the order, the name and quantity of the order, the date and time of the order, identifying information of the beacon and/or dining session in which the patron is in, the value amount to be transacted for each item of the order, information identifying the payment source a patron intends to use to eventually pay for the order, information identifying the beacon associated with the order. The order information may be received by computing server 208A using a communication circuitry or interface.

In some embodiments, computing server 208A, upon receiving the order information from a patron, may subsequently send relevant order information (e.g., name and quantity of the ordered items, beacon associated with the dining session of the order, etc.) to kitchen device 212A. Furthermore, in some embodiments, a patron may directly send order information to kitchen device 212A using the patron mobile device. However, in the embodiments depicted in FIG. 2A, a waiter may check-in at beacon 204A before computing server 208A can forward the order information of patron(s) to kitchen device 212A. In other embodiments, a waiter may need to check-in at a beacon to send orders of patron(s) to kitchen device 212, except for the orders of any new patron added to the dining session after the waiter has already checked in the order of previous patrons. For example, in order to expedite the dining experience of a latecomer to a dining event, the orders of any new patron may be subsequently sent to kitchen without the need for a waiter to check-in at beacon 204A.

Nevertheless, in the embodiments disclosed in FIG. 2A, at step 250, waiter 210 checks-in at beacon 204A associated with the dining session of first, second, and third patron. At step 252, as a result of waiter checking in at beacon 204A, the beacon signals computing server 208A to send the orders of third patron to kitchen device 212A. The beacon 204A may transfer the signal to computing server 208A electronically or wirelessly.

At step 254, computing server 208A communicates pending food and/or beverage orders (e.g., the orders made by the third patron) to the kitchen 212. In some embodiments, the orders are transmitted electronically and/or wirelessly from computing server 208A to kitchen device 212A over network 206. In some embodiments, for example, where the orders of a patron are communicated to the kitchen as a consequence of a waiter checking in, a waiter may specify whether the kitchen should start preparing, mixing, and/or cooking the ordered food and/or beverage immediately or not as immediately. Furthermore, in such embodiments, a waiter may specify whether the order should be prioritized over other orders. Information related to the ordered food and/or beverage may be received by kitchen device 212A and may be displayed on a user interface of the kitchen device 212A. The information related to the ordered food and/or beverage may include the content, name, and/or quantity of the food and/or beverage item that a patron has selected, the beacon associated with the selected order, the time at which the order had been selected, the time at which the order had been communicated to the kitchen, or any special instructions in regards to the preparation of the order.

FIG. 2B depicts a simplified sequence flow diagrams related to the serving of food and beverage orders in accordance with non-limiting embodiments of the personalized dining system.

Referring now to FIG. 2B, at step 256, kitchen 212 may inform computing server 208A, using kitchen device 212A, that a food and/or beverage that had been ordered by the first patron ("first patron order") is ready. The information may be sent electronically or wirelessly over network 206 to computing server 208A, using kitchen device 212A. In some embodiments, the kitchen 212 may directly send the information of an order being ready to waiter mobile device 210A. In some embodiments, kitchen 212 may also inform computing server 208A of other status updates related to patron orders, the status updates including, but not limited to, an order being placed in line for preparation ("in line" or "pending"), an order being prepared ("being prepared", "preparing"), an order being cooked ("cooking"), an ordered being mixed ("mixed"), etc. In some embodiments, an order that is "prepared" may be distinguished from an order "cooked" or "being cooked" in that a prepared order signifies that ingredients of the order ready but not cooked yet. An order that is "ready" or "complete" may signify that kitchen 212 has completed making the ordered food and/or beverage and the completed food and/or beverage can be picked up by waiter 210 and served to the patron(s). In some embodiments, kitchen 212 may also inform computing server 208A if an order cannot be prepared, cooked, and/or mixed, due to an ingredient being out of stock, for example ("out of stock").

At step 258, computing server 208A may send information of the first patron order being ready to the waiter mobile device 210A via network 206. The transmission of the information from computing server 208A to waiter mobile device 210A may be automatic, upon receiving information from kitchen device 212A of the first patron order being ready. In some embodiments, other status updates related to a patron order (e.g., in line, preparation, cooking, out of stock, etc.) may similarly be sent by computing server 208A to waiter mobile device 210A. In some embodiments, one or more of kitchen device, waiter mobile device, computing server, and/or patron mobile device may be synchronized periodically and/or continuously and/or have shared databases that may include data pertaining to ordered food and/or beverage items. In such embodiments, a status update, by kitchen 212, pertaining to an ordered food and/or beverage may be instantly stored in and/or be available for display on kitchen device 212A, waiter mobile device 210A, computing server 208A, and/or patron mobile device(s).

At step 260, kitchen 212 may inform computing server 208A, using kitchen device 212A, that a food and/or beverage that had been ordered by the second patron ("second patron order") is ready. Alternately or additionally, the kitchen 212 may directly send the information of an order being ready to waiter mobile device 210A. Like step 256, kitchen 212 may also inform computing server 208A of other status updates related to patron orders.

Like step 258, step 262 may include computing server 208A sending information of the second patron order being ready to the waiter mobile device 210A via network 206.

At step 264, kitchen 212 may inform computing server 208A, using kitchen device 212A, that a food and/or beverage that had been ordered by the third patron ("third patron order") is ready. Alternately or additionally, the kitchen 212 may directly send the information of an order being ready to waiter mobile device 210A. Like steps 256 and 260, kitchen 212 may also inform computing server 208A of other status updates related to patron orders.

Like step 258 and 262, step 266 may include computing server 208A sending information of the third patron order being ready to the waiter mobile device 210A via network 206.

At process 268, waiter 210 may deliver the ordered food and beverages that are now ready at the kitchen to the patron(s) and check-out. For example, after being informed that the food and/or beverage items ordered by the first, second, and third patrons are ready, a waiter may go to the kitchen, pick up the food and/or beverage items, and carry them over to the table at which the patrons are at. After being informed of a patron order being ready, a waiter may choose to deliver the food and/or beverage that had been ordered by the patron to the patron. However, as depicted in FIG. 2B, a waiter may choose to wait until the orders of all the patrons of an ongoing dining session are ready before a waiter delivers the orders to the patrons. A check-out by the waiter, like a check-in, may refer to associating waiter mobile device 210A with beacon 204A that may be affixed to the table at which the patron(s) are locates. The association may be performed, for example, by scanning a 1-dimensional or 2-dimensional bar code (e.g., QR code) of the beacon with the waiter mobile device. Alternately or additionally, the association may be made by entering waiter mobile device information into beacon 204A or entering identifying information of the beacon into the mobile device of the waiter. Alternately or additionally, waiter may simply check-out by using the waiter mobile device or the beacon individually (e.g., pressing a button on either device).

At step 270, as a consequence of a waiter checking out, beacon 204A signals to computing server 208A that waiter 210 has checked-out. The beacon 204A may transfer the signal to computing server 208A electronically or wirelessly.

At step 272, after receiving the signal from beacon 204A that waiter 210 checked out at beacon 204A, computing server 208A may calculate the final checks to be sent to the patron mobile device(s). The calculation may be performed by a processor within computing server 208A. In some embodiments, the calculation may be stored in a shared ledger replicated among other devices of the environment (e.g., patron mobile device(s), waiter mobile device 210A, kitchen device, etc.). In some embodiments, the calculations may be performed by utilizing block chain techniques.

It is contemplated that in various embodiments, the calculations may factor in coupons, vouchers, loyalty points, reward points, etc. In such embodiments, information related to a coupon, voucher, loyalty program, and/or reward program may be entered into a patron mobile device by a patron, for example, when the patron is selecting an order (e.g., as in steps 230, 232, and 248). Alternatively or additionally, information related to a coupon, voucher, loyalty program, and/or reward program may be entered into a waiter mobile device at the request of a patron. Subsequently, the information may be communicated to computing server 208A.

At steps 274, 276, and 278, computing server 208A may send the final checks, with the transaction amounts calculated in step 272, to the first patron device, second patron device, and third patron device, respectively. The final checks may enable the patron to pay the transaction amount, using a payment source of the patron (e.g., visa debit card, PayPal, etc.). In some embodiments, the final checks may also indicate a tip amount.

At steps 278, 280, and 282, a payment transaction authorization is sent to computing server 208A via network 206 from first patron device 202A, second patron device 202B, and third patron device 202C, respectively. The payment transaction authorization may include information on the payment amount to be transacted and information identifying a predetermined payment source for each of the respective patron(s) from which to transact the payment amount. Thus, for example, first patron may have a PayPal account on his or her mobile device that he or she may use in the payment transaction authorization sent to computing server 208A. If first patron decides to pay half of the final check, the payment transaction authorization sent to computing server 208A may include a payment amount that is half of the final check. The payment transaction authorization may also include information identifying first patron's PayPal account (e.g., account number) so as to enable computing server to initiate a process that may include a withdrawal of funds from first patron's PayPal account.

At step 284, computing server 208A may process the payment, for each of the patrons of the dining session, and terminate the dining session for the patrons. In some embodiments, the dining session may be terminated upon a successful processing of payments for the respective amounts indicated in the received payment transaction authorization requests using the payment source(s) and/or payment preferences indicated in the payment transaction authorization requests, for each of the patrons.

While FIGS. 2A-2B may depict computing server 208A and kitchen device 212A as being distinct, it is contemplated that in some embodiments, computing server 208A may be used as and/or be connected to kitchen device 212A, with a user interface displaying order information and enabling the input of status updates pertaining to orders by kitchen 212, among other functionalities. It is also contemplated that in some embodiments, the functions performed by computing server 208A may be performed entirely on a cloud system. It is also contemplated that in some embodiments, in lieu of beacon 204A, the functions ascribed to beacon 204A may be performed by a localized or proximity Wi-Fi.

FIGS. 3A-3E depict various screenshots of the user interface of a user of the personalized dining system who is a patron ("patron UI").

For example, FIG. 3A depicts a screenshot of a patron UI after a patron has been added to a dining session and the patron mobile device has received an interactive menu from the computing server. A dining session may have a unique identification ("dining session ID") that may be generated when the dining session is initiated by the computing server. The dining session ID may be related to and/or generated from one or more of the identifying information of a table and/or beacon at which the patron(s) of a dining session may be seated, the date and/or time of the creation of the dining session, the identifying information of the first patron, a randomly generated number, or a combination thereof. For example, Box 302A informs the patron user that patron has been added to dining session #3468 at beacon #9 of the fictitious "Best Restaurant." Thus, the dining session ID is a random number generated during the creation of the dining session and the identification of the beacon (e.g., beacon #9) may be used by the computing server to associate and track the locate the patron(s) of the dining session. Likewise, box 304A enables the patron user to access the interactive menu of the restaurant (e.g., Best Restaurant) and select orders.

FIG. 3B depicts a screenshot of a patron UI after a patron has opened an interactive menu of the fictitious "Best Restaurant." For example, as seen in the interactive menu of FIG. 3B, "Best Restaurant" serves several choices of Burgers 302B and Drinks 306B. Each item (e.g., the one or more burgers and one or more drinks) can be selected by the patron user for order.

FIG. 3C depicts an exemplary screenshot of the same patron UI after the patron has selected "Hamburger $9.99" (e.g., box 304B in FIG. 3B) in the patron UI depicted in FIG. 3B. As illustrated in FIG. 3C, a patron user may have the option of selecting any quantity 302C of the selected order. A patron user may have many options (e.g. 304C-308C) for selecting an order for one hamburger and splitting the cost ("tab option"), or may have the option to cancel the selection (e.g., 310C). For example, a patron may choose to pay for an item entirely by herself or himself (e.g., "Yes keep entirely on my tab" 304C). A patron may also choose to split the cost of an item evenly among patron(s) of the dining session (e.g. "Yes, add to group tab" 306C). In yet another embodiment, a patron may choose to split the cost of an item among one or more patrons of the dining session (e.g., "Yes, share with . . . " 308C). The one or more patrons may be identified by a name (e.g. if saved as a contact) or a mobile device identification (e.g., phone number). In some embodiments, the selected order and tab option may be automatically sent to the computing server after the patron submits a choice of a food and/or beverage item in the interactive menu (e.g., by clicking "yes"). The content, name, and quantity of the ordered item (e.g., one hamburger) may be sent along with one or more of the cumulative and/or individual value amounts of the ordered items, the selected tab option for each ordered item, information identifying the patron user, information identifying the beacon and/or dining session. In other embodiments, the selected orders and tab options of a patron user does not get sent to the computing server until a waiter comes and checks in at the beacon of the table at which the patron user is seated. For example, delaying the transmission of ordered food and/or beverage items of patron(s) of a dining session until a waiter comes by and checks-in allows the patron(s) to finalize their food and/or beverage choices and tab options, ask the waiter questions, and/or wait for other patron(s) to show up and be added on to the dining session. Additionally or alternately, in other embodiments, the selected orders of a patron user are sent directly to the kitchen upon selection of the order by the patron user (e.g., by clicking "yes").

Figure 3D:
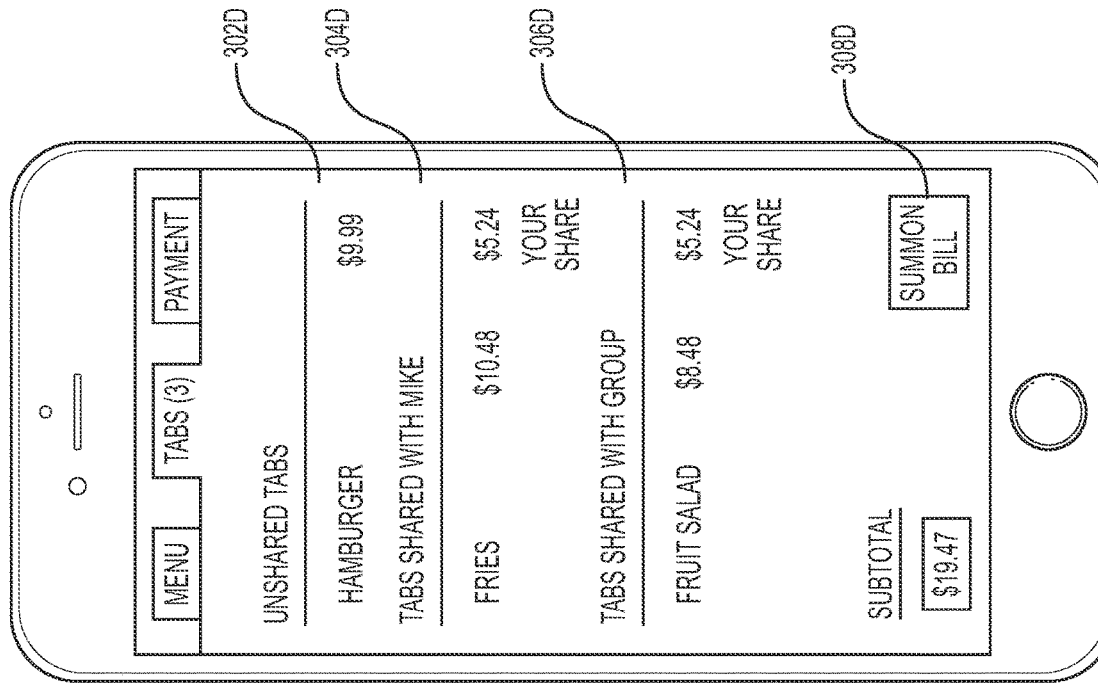
Figure 3C:
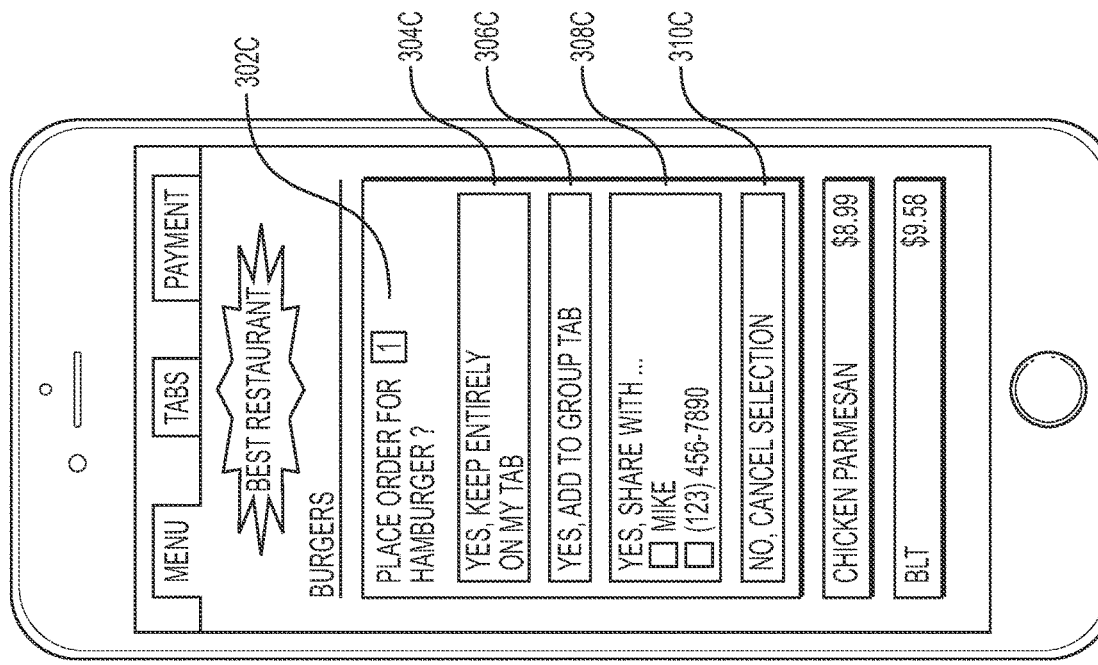

FIG. 3D depicts an exemplary screenshot of a patron UI that may show the tab options that a patron has selected for ordered food and/or beverage items. In one embodiment, items that a patron has designated to be paid solely by patron may be shown in one section, for example, "Unshared tabs" 302D. Items that a patron has designated to be paid evenly by one or more predetermined patrons of a dining section may be shown in one section, for example, "Tabs shared with Mike" 304D. Items that a patron has designated to be paid all patrons of a dining section may be shown in one section, for example, "Tabs shared with group" 306D. In some embodiments, a value amount of each item along with the value amount owed by a patron, if the value amount has been split, may be shown. Furthermore, the cumulative value amount for the ordered items may be shown, for example, as "Subtotal" 308D. In some embodiments, a patron may choose to pay the amount owed at any time during the dining session. For such embodiments, a patron may choose to pay, for example, by selecting the option "Summon Bill" 310D on the patron mobile device.

FIG. 3E depicts an exemplary screenshot of the same patron UI after the patron has selected "Summon Bill" (e.g., box 308D in FIG. 3D) in the patron UI depicted in FIG. 3D. Alternatively or additionally, FIG. 3 may depict an exemplary screenshot of a patron UI after a waiter has checked out of a dining session by associating a waiter mobile device with a beacon, resulting in the computing server transmitting the bill to the patron mobile device. In some embodiments, the patron UI may display, as in 302E, information identifying the waiter, beacon, and/or dining session, and may display the number of patrons for the dining session. The patron UI may display, as in 204E, a cumulative and/or itemized value amounts for the ordered food and/or beverage items, and the tax incurred as a result of the ordered food and/or beverage items. Furthermore, the patron UI may include an option of entering a tip amount or percentage (e.g., 306E) and may display a total payment amount (e.g., 308E) that may reflect the inclusion of a selected tip amount or percentage. Even further, the patron UI may provide the patron with an option of choosing a payment method. The patron may choose for example, whether to pay using a PayPal account, a saved debit or credit card account, and/or rewards or loyalty program account. In addition, the patron may be able to add and/or delete payment source(s) and/or payment methods to the existing list of payment methods. A user may decide to pay and thereby transmit a payment transaction authorization, from the patron mobile device to the computing server to transact the final payment amount from the payment source of the patron.

In some embodiments, user interface as exemplified in the screenshots for FIG. 3A-3C, 3D, and 3E, may be accessible to the patron via indices at the top of the screenshot, for example, "menu", "tabs", and "payment", respectively.

Figure 4:
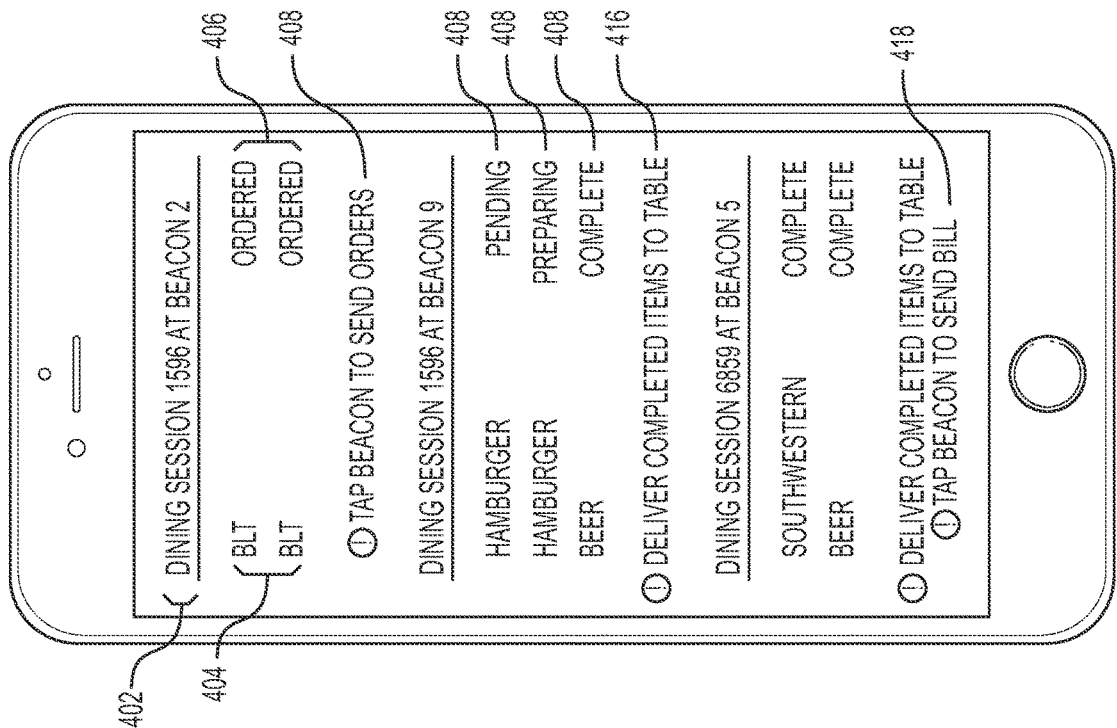
FIG. 4 depicts a screenshot of a waiter user interface of the personalized dining system.

FIG. 4 depicts a screenshot of the user interface of a user of the personalized dining system who is a waiter ("waiter UI"). As depicted in FIG. 4, the waiter UI may display one or more ongoing dining sessions 402, indicated by an identification of a table or beacon, and/or randomly generated number, associated with the dining session (e.g., Table 1596, Table 3468, Table 6859, etc.). For example, within a section devoted to an ongoing dining session 402, the patron UI may list the orders 404 of the patron(s) of the dining session, along with the status of each order. The status may include an indication that an ordered item has been simply been ordered but the order has yet to be sent to the kitchen (e.g. "ordered" 406). In such cases, the waiter may be notified that he or she may need to check-in at the beacon associated with the dining session at which an item is marked as only "ordered" (e.g., "Tap beacon to send orders" 408). The status may also include an indication that the kitchen is now informed of a patron's order but that the kitchen has not started preparing the order yet (e.g., "pending" 410). A status may also indicate that an order is being prepared at the kitchen (e.g., "preparing" 412) or that an ordered food and/or beverage has been prepared already (e.g., "complete" 414). In some embodiments, where ongoing dining session includes a completed order, the patron may be notified to pick up the completed order and deliver to the patron(s) of the ongoing dining session (e.g., "Deliver Completed Items to Table" 416). In some embodiments, where all food and beverage orders of a dining session are completed (e.g., as in the orders for Table 6859), the waiter may also be notified that he or she may check-out the dining session, which may refer to notifying the computing server that the patron(s) can now have bills and/or final checks sent to their mobile device(s). In some embodiments, a waiter may check-out by tapping the beacon associated with an ongoing dining session (hence the notification "Tap Beacon to Send Bill" 418). In some embodiments, a waiter may be notified that he or she is being summoned or called by patron(s) to a table where patron(s) are seated. In another embodiment, the waiter UI may enable the waiter to send notifications to the kitchen via the computing server and/or network. These notifications may include, for example, special instructions for the preparation, cooking, or mixing of an ordered food and/or beverage, or an instruction to prioritize or rush one or more ordered food and/or beverages.

Figure 5:
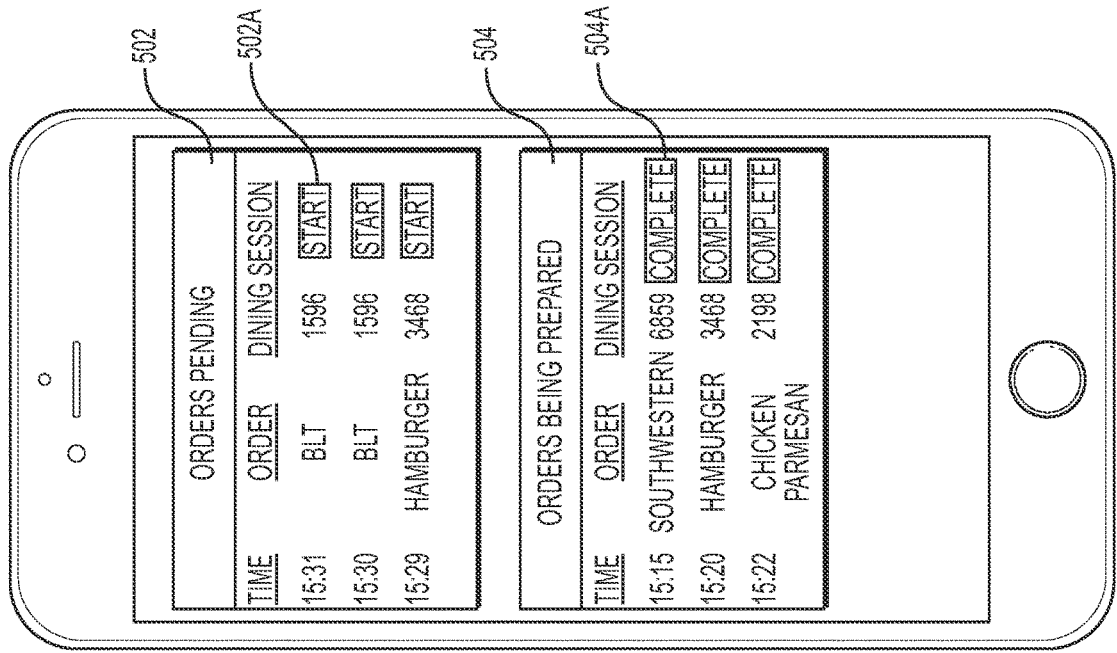
FIG. 5 depicts a screenshot of a kitchen personnel user interface of the personalized dining system.

FIG. 5 depicts a screenshot of the user interface of a user of the personalized dining system who is a kitchen personnel ("kitchen UI"). As depicted in FIG. 5, kitchen UI may display pending food and beverage orders from patron(s) of a dining session ("orders pending") and food and beverage orders currently being prepared. In one embodiment, as depicted in FIG. 5, pending food and beverage orders ("orders pending") may be displayed reverse chronologically, while the orders being prepared may be displayed chronologically. An order within each list may include details pertaining to the order, including but not limited to, the time at which the order was received (e.g., for orders pending) or the time at which the preparation for the ordered food or beverage began (e.g., for orders being prepared), the name or content of the order (e.g., BLT, Hamburger, Southwestern, Chicken Parmesan, etc.). Next to each row of information pertaining to an order, they may be one or more buttons enabling kitchen personnel to indicate a status change in regards to the order. For example, as depicted in FIG. 5, under the section "Orders Pending" 502, a "Start" button 502A next to a row of details pertaining to an order may enable the kitchen personnel to move a listed order into the "Orders Being Prepared" section. Likewise, under the section "Orders Being Prepared" 504, a "Completed" button 504A next to a row of details pertaining to an order may enable the kitchen personnel to remove the listed order from the "Orders Being Prepared" section. By clicking on such buttons pertaining to the status change of an ordered food and/or beverage, kitchen personnel may send notification of the status change to a waiter mobile device via the computing server and/or network. In some embodiments, the kitchen UI may also enable the kitchen personnel to notify the waiter if an order cannot be prepared, for example, due to an ingredient being out of stock. Furthermore, in some embodiments, the kitchen UI may also display special instructions and/or priority requests regarding an order. In some embodiments, the kitchen UI may also include additional sections (e.g., completed food and beverage orders) or divide a section further. For example, the kitchen UI may subdivide the section, orders being prepared, to distinguish between orders whose ingredients are being prepared and orders being cooked.

Figure 6A:
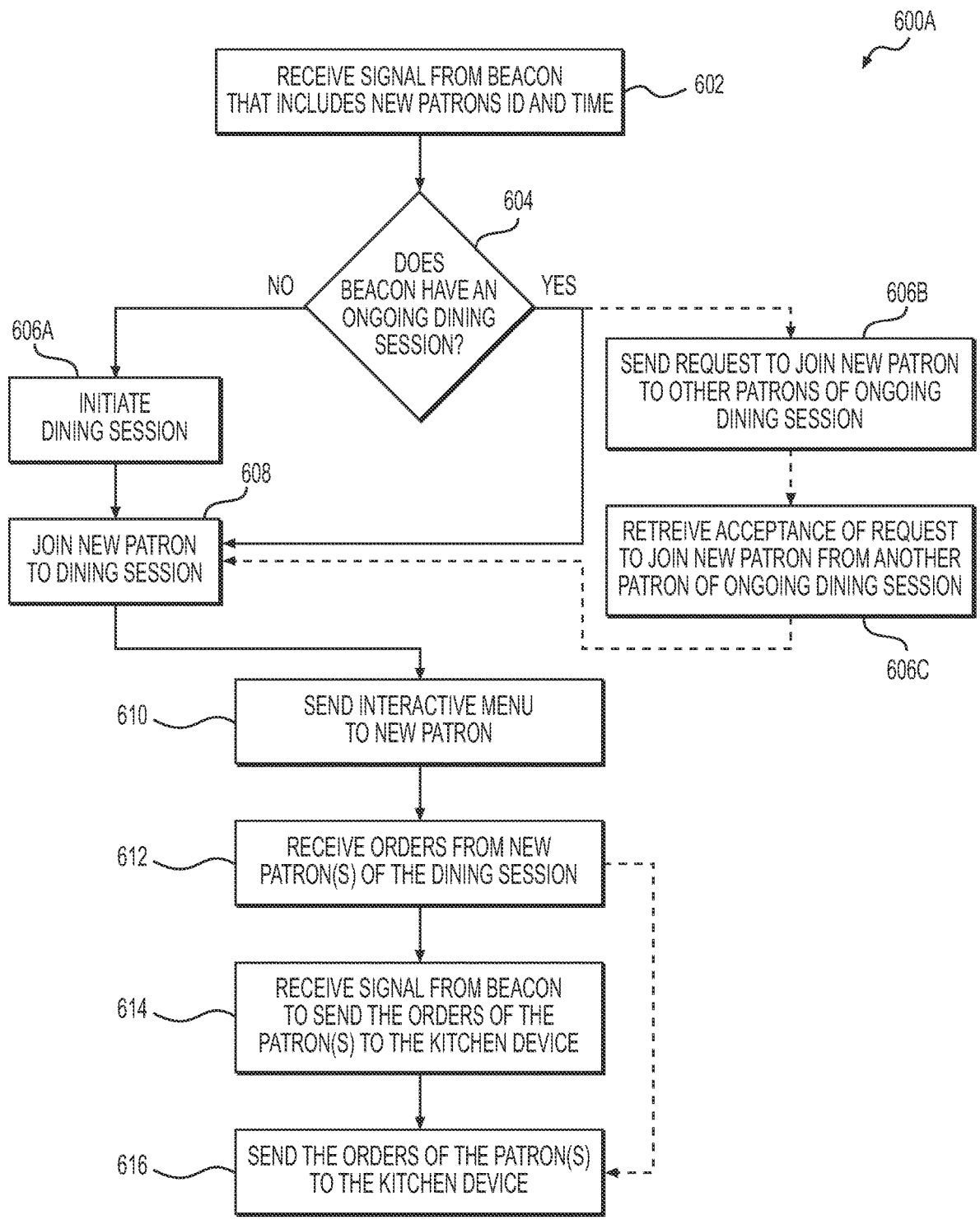
FIG. 6A-6B are flow charts depicting example processes executed by a personalized dining computing system ("computing server").
Figure 6B:
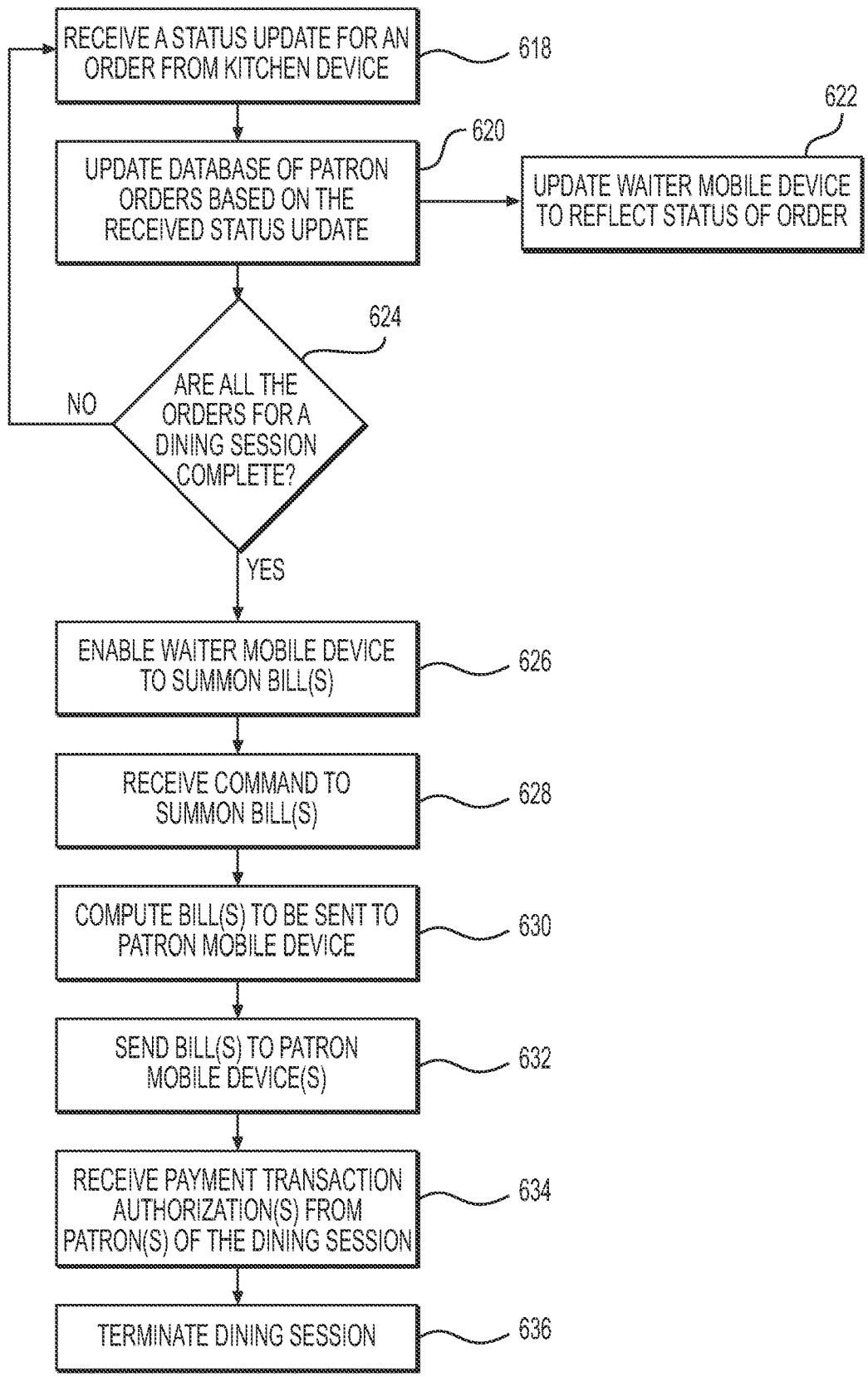

FIG. 6A-6B are flow charts depicting example processes executed by a personalized dining computing system ("computing server").

Specifically, FIG. 6A depict an example process 600A by which the computing server creates a dining session, adds a new patron to the dining session, and sends the orders of the patron(s) of the dining session to the kitchen device.

Step 602 may include receiving a signal from a beacon that includes identifying information of a new patron (new patron ID), identifying information of the beacon and/or table associated with the beacon (table ID), and temporal information pertaining to the signal (time). He computing server itself may have a record of table IDs for each of the beacons or tables associated with the beacons at a dining venue.

Step 604 may include determining whether the table or beacon associated with table ID has an ongoing dining session. Step 604 may include searching for the table ID within the memory of computing server and determining whether, at the received time from step 602, the table or beacon associated with the table ID has an ongoing dining session.

If, subsequent to step 604, the table or beacon associated with table ID does not have an ongoing dining session, step 606A may include initiating dining session. Initiating a dining session may include logging on to the memory space within the computing server devoted to table ID, a time entry of the start of the dining session and/or an indication that there is now an ongoing dining session at the table and/or beacon associated with the table ID. In some embodiments, the dining session itself may also have an identification, which may be related to a randomly generated number, an identification of a patron of that dining session, the table ID, the date and/or time of the start of the dining session, or a combination thereof.

Subsequent to step 606A, step 608 may include joining the new patron to the dining session. In some embodiments, joining a new patron to the dining session may include searching for the dining session within the memory space devoted to table ID, and adding the patron, to what may become a list of patron(s) as other patron(s) join. In some embodiments, patron(s) may be listed using an identification of a patron, which may include but is not limited to an identification related to the mobile device of the patron (e.g., mobile device number), a payment source of the patron (e.g., a primary account number), a biographical identification of the patron (patron name, gender, age, etc.), a randomly generated number, etc.

If, subsequent to step 604, the table or beacon associated with table ID does have an ongoing dining session, computing server may also perform step 608 of joining the new patron to the ongoing dining session. In some embodiments, joining a new patron to the dining session may include searching for the dining session within the memory space devoted to table ID, and adding the patron, to any existing list of patron(s).

Alternatively or additionally, prior to a new patron being joined to the ongoing dining session if the table or beacon associated with table ID does have an ongoing dining session, steps 606B and 606C may include sending a request to join the new patron ("request") to other patron(s) of the ongoing dining session, and receiving an acceptance of the request from another patron of the ongoing dining session, respectively. Thereafter, computing server may join the new patron to the ongoing dining session (e.g., step 608).

After a new patron has been added to the dining session, step 610 may include sending an interactive menu to the mobile device of the new patron. The interactive menu may list, the food and/or beverage items that may be ordered at a dining venue and the price of the food and/or beverage items. Furthermore, the interactive menu may enable the new patron to select food and/or beverage items to be ordered ("select orders" or "order").

At step 612, the computing server may receive the orders from the new patron. The orders of a patron may be communicated by the computing server from a patron mobile device via a network. Step 612 may further include saving the ordered items of the patron within the memory space devoted to the patron that may be within the memory space devoted to the dining session, within the memory space devoted to the table ID. In some embodiments, the orders received at step 612 may be initially saved in a temporary memory space, since a patron may change his or her orders.

At step 614, computing server may receive a signal from the beacon associated with the ongoing dining session to send the orders of the patron(s) of the ongoing dining session to the kitchen device. The signal may be electronic and/or a property of an electromagnetic wave (e.g., radiofrequency) sent by the beacon. In some embodiments, the signal may include, one or more of, an identification of the beacon from which the signal originates from, an indication that the signal is to inform the computing server to send the orders of the patron(s) of the dining session associated with the beacon to the kitchen device. The beacon may send the signal following a waiter checking in to the beacon affixed to the table at which the patron(s) of the ongoing dining session may be seated.

Thus, the sequence of events related to steps 612 to 616 may be as follows. Once one or more patrons of a dining session decide their orders and select their ordered food and/or beverage items on the interactive menu on their mobile devices, the selected orders of each patron may be sent to the computing server, where the selected orders may be temporarily stored. Once a waiter checks-in at the beacon of the table at which the patron(s) are seated, the beacon sends a signal to the computing server.

Subsequent to receiving the signal from the beacon, the computing server may, at step 616, send the order(s) of the patron(s) of the dining session to the kitchen device. The orders may be sent to the kitchen device electronically and/or wirelessly via a network.

In some embodiments, the computing server need not wait to receive a signal from beacon. For example, as an alternative or an addition to step 614, the computing system may send the orders of the patron(s) of the dining session to the kitchen device subsequently after receiving the orders from the patron(s).

FIG. 6B depicts an example process 600B by which the computing server manages the status updates of an ordered food and/or beverage item and terminates a dining session.

At step 618, the computing server may receive a status update related to an ordered food and/or beverage item ("status update for an order") from the kitchen device. The status update may indicate, for example, whether an order has been placed in line for being prepared (e.g., as in "pending" 410 in FIG. 4), whether the order is currently being prepared (e.g., as in "preparing" 412 in FIG. 4), or whether the kitchen personnel have finished making the ordered food and/or beverage item (e.g., as in "complete" 414 in FIG. 4). The status update may be inputted by kitchen personnel into the kitchen device and the input may be transmitted to the computing server via a network. In one embodiment, the kitchen user interface enabling an input of a status update regarding an order may be a part of or a peripheral device of the computing server.

At step 620, the computing server may update its database on patron orders and statuses of patron orders ("database") based on the received status update. In some embodiments, the database may be within the memory space devoted to the dining session in the computing server. The database within the computing server may serve as a master database, which may be replicated elsewhere or serve as a source for synchronization of databases in other devices.

For example, at step 622, the waiter mobile device may replicate and/or synchronize the status updates for the ordered items with that of the computing server. In some embodiments, the database of patron orders and status of patron orders within the computing server and waiter mobile device may be continually and/or periodically synchronized based on the status updates from the kitchen device. After being synchronized to reflect the status of an order the waiter mobile device may notify the waiter, via a message on the waiter user interface. In some embodiments, if a status update pertains to an order being complete (e.g., a food and/or beverage is ready for a waiter to pick-up from the kitchen and deliver to the patron(s)), a message may be automatically generated by the waiter device, for example, "Deliver Completed Items to Table" 416 in FIG. 4.

At step 624, computing server may determine whether the all the ordered food and/or beverage items of a dining session are complete. Performing step 622 may necessitate the computing server to access its database of patron orders for the dining session and determine whether the statuses for all the orders are indicated to be complete. Kitchen personnel may input a status update for an order as complete when the ordered food and/or beverage is ready for a waiter to pick up from the kitchen and to be delivered to the patron(s) who had originally ordered the food and/or beverage.

If subsequent to step 624, the computing server determines that not all orders of a dining session have been completed, the computing server may continue to receive status of the ordered item from the kitchen device (e.g., as in step 618), and update its database of patron orders based on the received status update (e.g., as in step 620), for that dining session.

If subsequent to step 624, the computing server determines that all orders of a dining session have been completed, step 626 may include enabling the waiter mobile device to summon bill(s) to the patron mobile devices of the dining session. The waiter mobile device may be enabled by allowing the association of the waiter mobile device and the beacon of the dining session to result in a signal being sent from the beacon to the computing server. In one embodiment, a waiter mobile device may be able to summon a bill only when less than all of the ordered items have been delivered to the patron(s) of the dining session. The association of the waiter mobile device and beacon as a condition for the summoning of the bill may help ensure that a waiter of a dining venue delivers the completed items to patron(s) before the patron(s) receive bill(s). It is also foreseeable, however, that a patron of a dining session may want to pay the bill earlier, before all the ordered items of a dining session have arrived, for example, in a situation where a patron needs to leave early. Therefore, in some embodiments, a patron may also be able to summon the bill using the patron mobile device and/or by associating patron mobile device with the beacon.

At step 628, a computing server may receive a command to summon bill(s) to the patron mobile device(s). In some embodiments, the command may be a signal generated from the beacon as a result of the association between the waiter mobile device and the beacon. In other embodiments, the command may be generated from a patron mobile device, for example, by a patron who wishes to leave earlier than the other patron(s) of the dining session from the dining event.

At step 630, the computing server may compute the bill(s) to be sent out to patron mobile device(s). Step 630 may include computing the value amounts of the ordered food and/or beverage items for each patron of the dining session, and adding any necessary gratuities, tips, taxes, and/or overhead expenses. The computation may be performed using a processor of the computing server.

At step 632, the computed bill(s) may be sent to the patron mobile device(s) of the dining session via a network. After patron(s) receive the bill(s) on their respective patron mobile device(s), the patrons may send payment transaction authorizations to the computing server authorizing the computing server to charge the patron(s) for the respective amounts listed on the bill(s).

Thus, at step 634, the computing server may receive payment transaction authorization(s) from the patron(s) of the dining session. The payment transaction authorizations may include one or more of information identifying the payment source of a patron from which to withdraw funds for the transaction, information identifying the patron and/or patron mobile device, the amount to be transacted, and/or the itemization of the amount to be transacted.

At step 636, the computing server may terminate the dining session associated with the patron(s) from which the payment transaction authorizations had been received. In some embodiments, a condition for terminating the dining session may be that payment transaction authorizations received from patron(s) satisfy the total value amounts of the service rendered, e.g., the bills sent to the patron(s) in step 632 have been paid for. In other embodiments, a computing server may terminate the dining session even if less than the total value amount has been satisfied, for example, to allow for other incoming patron(s) to be seated at a table and have a new dining session be initiated. In some embodiments, terminating a dining session may include one or more of entering the time at which a dining session has ended for a particular beacon and/or table associated with a beacon in a database.

In some embodiments, the computing server may request and/or, receive personal and/or identifying information of the patron (e.g., name, address, telephone number, etc.). The personal and/or identifying information may be used, for example, to survey the patrons on their dining experience, send advertising, promotional, and/or informative items to the patron mobile devices.

In some embodiments, patron mobile devices associated with a beacon, or associated with beacons of the restaurant may be able to communicate with one another (e.g., via a chat platform open to patrons of a table or patrons of the dining venue).

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method for managing personalized joint transactions created by individualized transaction item ownership or payment enabled by associating device and service location service location indicia, the method comprising:

receiving information identifying the mobile devices of one or more parties to a joint transaction and information identifying a service location indicia as a result of associating the mobile devices of the one or more parties to the joint transaction with the service location indicia;

receiving payment preferences from each of the one or more parties to the joint transaction, the payment preferences identifying the mobile devices of the one or more parties to the joint transaction and the service location indicia;

prompting an association of a mobile device of a customer service representative with the service location indicia after delivery of requested products or services to the one or more parties to the joint transaction;

determining amounts owed by each party to the joint transaction;

receiving a payment transaction authorization from the mobile device of each party to the joint transaction; and processing the payment transaction for each party to the joint transaction.

2. The computer-implemented method of claim 1, wherein the payment preference of a party to the joint transaction includes one or more of, whether a party to the joint transaction has selected to split the joint transaction amount for a requested product or service with one or more other parties to the joint transaction; and whether a party to the joint transaction has selected to pay an additional amount for tip or gratuity.

3. The computer-implemented method of claim 1, wherein the payment preferences are associated with each product or service, and wherein determining the amounts owed by a party to the joint transaction is based on products or services requested by the party to the joint transaction, transaction amounts for each product or service, and the payment preference of the party to the joint transaction for each requested product or service, and includes one or more of determining the share of a joint transaction amount for a requested product or service owed by the party to the joint transaction, if the party to the joint transaction has selected to split the joint transaction amount for a requested product or service with one or more other parties to the joint transaction;

determining a cumulative subtotal amount owed by the party to the joint transaction by adding the joint transaction amounts and shares of joint transaction amounts for products or services owed by the party to the joint transaction;

adding any taxes or service fees;

deducting any discounts; and adding any additional amount that a party to the joint transaction has selected to pay for tip or gratuity.

4. The computer-implemented method of claim 1, further comprising initiating the joint transaction based on information identifying the mobile device of the one or more parties to the joint transaction and information identifying the service location indicia; and adding each of the one or more parties to the joint transaction to the joint transaction.

5. The computer-implemented method of claim 4, wherein initiating a joint transaction includes:

locating, within a memory or database, the service location indicia using information identifying the service location indicia; and saving to the memory or database, information identifying mobile devices of the one or more parties to the joint transaction.

6. The computer-implemented method of claim 4, further comprising:

verifying that amounts to be paid in the payment transaction authorizations received from each party to the joint transaction satisfy a sum of the amounts owed by each party to the joint transaction; and terminating the joint transaction upon verifying that the amounts to be paid in the payment transaction authorizations received from each party to the joint transaction of the joint transaction satisfy the sum of the amounts owed by each party to the joint transaction.

7. The computer-implemented method of claim 1, wherein associating the mobile devices of the one or more parties to the joint transaction with the service location indicia includes:

scanning or making contact, using the mobile devices of the one or more parties to the joint transaction, one or more of,
an electronic device having a bar code,
a radiofrequency identification (RFID) device,
a passive integrated circuit,
a near field communication (NFC) device, or
any device having a mechanism to relay information identifying a mobile device or information confirming the delivery of products or services to the parties to the joint transaction.

8. The computer-implemented method of claim 1, further comprising receiving requests for products or services and transaction amounts for each product or service from each of the one or more parties to the joint transaction, wherein the payment preferences are associated with each product or service, and wherein receiving requests for products or services, transaction amounts for each product or service, and payment preferences associated with each product or service from each of the one or more parties to the joint transaction includes:

sending to the mobile devices of the one or more parties to the joint transaction an interactive menu enabling the parties to the joint transaction to select products or services for a joint transaction amount and a payment preference associated with each selected product or service;

receiving a request for selected products or services and transaction amounts for the selected products or services from the mobile devices of the one or more parties to the joint transaction; and receiving a payment preference for each selected product or service, from the mobile devices of the one or more parties to the joint transaction.

9. The computer-implemented method of claim 8, further comprising transmitting the requests for products or services of the one or more parties to the joint transaction and information identifying the service location indicia to a user interface accessible to kitchen personnel;

receiving, from the user interface accessible to kitchen personnel, status updates related to the preparation of products or services of the one more parties to the joint transaction and information identifying the service location indicia associated with the one or more mobile devices of the one or more parties to the joint transaction; and transmitting the received status updates and information identifying the service location indicia, to a mobile device of a customer service representative, wherein, a status update indicating that the preparation of the products or services is complete includes the information identifying the service location indicia associated with the mobile devices of one the or more parties to the joint transaction to whom the requested products or services are to be delivered.

10. The computer-implemented method of claim 1, further comprising:

outputting the amount owed by each to an electronic storage medium or display of the mobile device of each party to the joint transaction.

11. The computer-implemented method of claim 1, wherein receiving information confirming the delivery of the requested products or services to the one or more parties to the joint transaction includes:

receiving the association of a mobile device of a customer service representative with the service location indicia confirming the delivery of the requested products or services to the one or more parties to the joint transaction.

12. The computer-implemented method of claim 9, wherein transmitting the requests for products or services of the one or more parties to the joint transaction and information identifying the service location indicia to the user interface accessible to kitchen personnel includes:

transmitting any requests to expedite, prioritize, delay, or prepare with special instructions, one or more products or services requested by the one or more parties to the joint transaction, from the mobile device of the party to the joint transaction or customer service representative.

13. A system for managing personalized joint transactions created by individualized transaction item ownership or payment enabled by associating device and service location indicia, the system comprising:

a data storage device storing instructions for managing personalized joint transactions created by individualized transaction item ownership or payment enabled by associating device and service location indicia; and a processor configured to execute the instructions to perform a method including:

receiving information identifying the mobile devices of one or more parties to a joint transaction and information identifying a service location indicia as a result of associating the mobile devices of the one or more parties to the joint transaction with the service location indicia;

receiving payment preferences from each of the one or more parties to the joint transaction, the payment preferences identifying the mobile devices of the one or more parties to the joint transaction and the service location indicia;

prompting an association of a mobile device of a customer service representative with the service location indicia after delivery of requested products or services to the one or more parties to the joint transaction;

determining amounts owed by each party to the joint transaction;

receiving a payment transaction authorization from the mobile device of each party to the joint transaction; and processing the payment transaction for each party to the joint transaction of the joint transaction.

14. The system of claim 13, wherein the payment preference of a party to the joint transaction includes one or more of, whether a party to the joint transaction has selected to split the transaction amount for a requested product or service with one or more other parties to the joint transaction; and whether a party to the joint transaction has selected to pay an additional amount for tip or gratuity.

15. The system of claim 13, wherein the payment preferences are associated with each product or service, and wherein determining the amounts owed by a party to the joint transaction is based on products or services requested by the party to the joint transaction, transaction amounts for each product or service, and the payment preference of the party to the joint transaction for each requested product or service, and includes one or more of determining the share of a transaction amount for a requested product or service owed by the party to the joint transaction, if the party to the joint transaction has selected to split the transaction amount for a requested product or service with one or more other parties to the joint transaction;

determining a cumulative subtotal amount owed by the party to the joint transaction by adding the transaction amounts and shares of transaction amounts for products or services owed by the party to the joint transaction;

adding any taxes or service fees;

deducting any discounts; and adding any additional amount that a party to the joint transaction has selected to pay for tip or gratuity.

16. The system of claim 13, wherein the system is further configured for:

initiating the joint transaction based on information identifying the mobile device of the one or more parties to the joint transaction and information identifying the service location indicia; and adding each of the one or more parties to the joint transaction to the joint transaction.

17. The system of claim 16, wherein initiating a joint transaction includes:

locating, within a memory or database, the service location indicia using information identifying the service location indicia; and saving to the memory or database, information identifying mobile devices of the one or more parties to the joint transaction.

18. The system of claim 16, wherein the system is further configured for:

verifying that amounts to be paid in the payment transaction authorizations received from each party to the joint transaction satisfy a sum of the amounts owed by each party to the joint transaction; and terminating the joint transaction upon verifying that the amounts to be paid in the payment transaction authorizations received from each party to the joint transaction of the joint transaction satisfy the sum of the amounts owed by each party to the joint transaction.

19. A non-transitory machine-readable medium storing instructions that, when executed by a system for managing personalized joint transactions created by individualized transaction item ownership or payment enabled by associating device and service location indicia, cause the personalized joint transactions computing system to perform a method for managing personalized joint transactions created by individualized transaction item ownership or payment enabled by associating device and service location indicia, the method including:

receiving information identifying the mobile devices of one or more parties to a joint transaction and information identifying a service location indicia as a result of associating the mobile devices of the one or more parties to the joint transaction with the service location indicia;

receiving payment preferences from each of the one or more parties to the joint transaction, the payment preferences identifying the mobile devices of the one or more parties to the joint transaction and the service location indicia;

prompting an association of a mobile device of a customer service representative with the service location indicia after delivery of requested products or services to the one or more parties to the joint transaction;

determining amounts owed by each party to the joint transaction;

receiving a payment transaction authorization from the mobile device of each party to the joint transaction; and processing the payment transaction for each party to the joint transaction of the joint transactions.

20. The machine-readable medium of claim 19, wherein the payment preference of a party to the joint transaction includes one or more of, whether a party to the joint transaction has selected to split the transaction amount for a requested product or service with one or more other parties to the joint transaction; and whether a party to the joint transaction has selected to pay an additional amount for tip or gratuity.

* * * * *

UNITED STATES PATENT AND TRADEMARK OFFICE
CERTIFICATE OF CORRECTION

PATENT NO. : 11,270,394 B2
APPLICATION NO. : 17/150447
DATED : March 8, 2022
INVENTOR(S) : Coy A. Christensen et al.

It is certified that error appears in the above-identified patent and that said Letters Patent is hereby corrected as shown below:

In the Claims

Column (26), Line (26), Claim 1, delete "service location service location" and insert --service location--.
Column (26), Line (67), Claim 3, delete "of" and insert --of:--.
Column (27), Lines (23-24), Claim 4, delete "to the joint transaction to the joint transaction." and insert --to the joint transaction.--.
Column (27), Lines (41-42), Claim 6, delete "to the joint transaction to the joint transaction." and insert --to the joint transaction.--.
Column (28), Line (26), Claim 9, delete "one more" and insert --one or more--.
Column (28), Line (37), Claim 9, delete "of one the" and insert --of the one--.
Column (29), Lines (28-29), Claim 13, delete "to the joint transaction of the joint transaction." and insert --to the joint transaction.--.
Column (29), Line (47), Claim 15, delete "of" and insert --of:--.
Column (30), Lines (3-4), Claim 16, delete "to the joint transaction to the joint transaction." and insert --to the joint transaction.--.
Column (30), Lines (22-23), Claim 18, delete "to the joint transaction of the joint transaction." and insert --to the joint transaction.--.
Column (30), Lines (54-55), Claim 19, delete "to the joint transaction of the joint transactions." and insert --to the joint transaction.--.

Signed and Sealed this
Twenty-fourth Day of May, 2022

Katherine Kelly Vidal
*Director of the United States Patent and Trademark Office*